US012671810B2

(12) United States Patent
Leléannec et al.

(10) Patent No.: US 12,671,810 B2
(45) Date of Patent: Jun. 30, 2026

(54) METHODS AND APPARATUS OF ENCODING/DECODING VIDEO PICTURE PARTITIONED IN CTU GRIDS

(71) Applicant: Beijing Xiaomi Mobile Software Co., Ltd., Beijing (CN)

(72) Inventors: Fabrice Leléannec, Beijing (CN); Pierre Andrivon, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 18/850,926

(22) PCT Filed: Feb. 22, 2023

(86) PCT No.: PCT/CN2023/077749
§ 371 (c)(1),
(2) Date: Sep. 25, 2024

(87) PCT Pub. No.: WO2023/185333
PCT Pub. Date: Oct. 5, 2023

(65) Prior Publication Data
US 2025/0211739 A1 Jun. 26, 2025

(30) Foreign Application Priority Data

Mar. 31, 2022 (EP) ..................................... 22305407

(51) Int. Cl.
*H04N 19/119* (2014.01)
*H04N 19/14* (2014.01)
*H04N 19/172* (2014.01)

(52) U.S. Cl.
CPC ........... *H04N 19/119* (2014.11); *H04N 19/14* (2014.11); *H04N 19/172* (2014.11)

(58) Field of Classification Search
CPC ..... H04N 19/119; H04N 19/14; H04N 19/172
(Continued)

(56) References Cited

U.S. PATENT DOCUMENTS

2014/0205003 A1* 7/2014 Han ..................... H04N 19/103
375/240.03
2019/0313097 A1 10/2019 Urban et al.
(Continued)

FOREIGN PATENT DOCUMENTS

CN 113545091 B * 9/2023 ............. H04N 19/70
JP 2023041687 A * 3/2023 ........... H04N 19/136
WO WO-2020142540 A1 * 7/2020 ........... H04N 19/119

OTHER PUBLICATIONS

Extended European Search Report Issued in Application No. 22305407.3 dated Sep. 28, 2022, 13 pages.
(Continued)

*Primary Examiner* — Behrooz M Senfi
(74) *Attorney, Agent, or Firm* — Finnegan, Henderson, Farabow, Garrett & Dunner, L.L.P.

(57) ABSTRACT

A method for encoding a video picture into a bitstream of encoded video picture data, includes: encoding into the bitstream a default width and a default height of coding-tree unit of a grid of coding-tree units splitting the video picture into picture areas, each coding-tree unit being a picture area subdivided according to a coding tree; encoding, into the bitstream, a width of at least one coding-tree unit of the grid of coding-tree units different from the default width and/or a height of at least one coding-tree unit of the grid of coding-tree units different from the default height; obtaining encoded video picture data by encoding at least one coding unit (CU) of a coding tree associated with each coding-tree unit (CTU) of the grid of coding-tree units; and writing the encoded video data into the bitstream.

20 Claims, 14 Drawing Sheets

(58) Field of Classification Search
    USPC ..................................................... 375/240.02
    See application file for complete search history.

(56)                       References Cited

U.S. PATENT DOCUMENTS

| | | | | |
|---|---|---|---|---|
| 2021/0006783 A1* | 1/2021 | Skupin | ................. | H04N 19/176 |
| 2021/0258576 A1* | 8/2021 | LeLeannec | ............ | H04N 19/96 |
| 2025/0294155 A1* | 9/2025 | Xu | ........................ | H04N 19/186 |

OTHER PUBLICATIONS

ISA China National Intellectual Property Administration, International Search Report and the Written Opinion of the International Searching Authority Issued in Application No. PCT/CN2023/077749, Apr. 6, 2023, WIPO, 13 pages.

Agrafiotis, D. et al., "Towards Efficient Context-Specific Video Coding Based on Gaze-Tracking Analysis", ACM Transactions on Multimedia Computing, Communications and Applications, vol. 3, No. 4, Article 21, Dec. 2007, 15 pages.

* cited by examiner

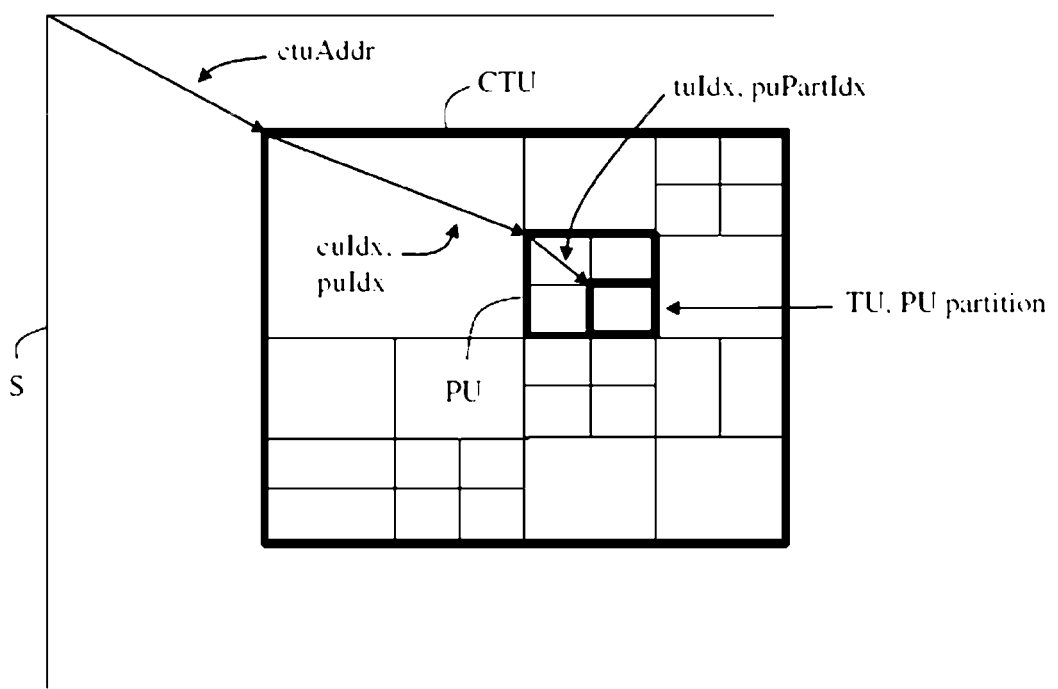
FIG. 1
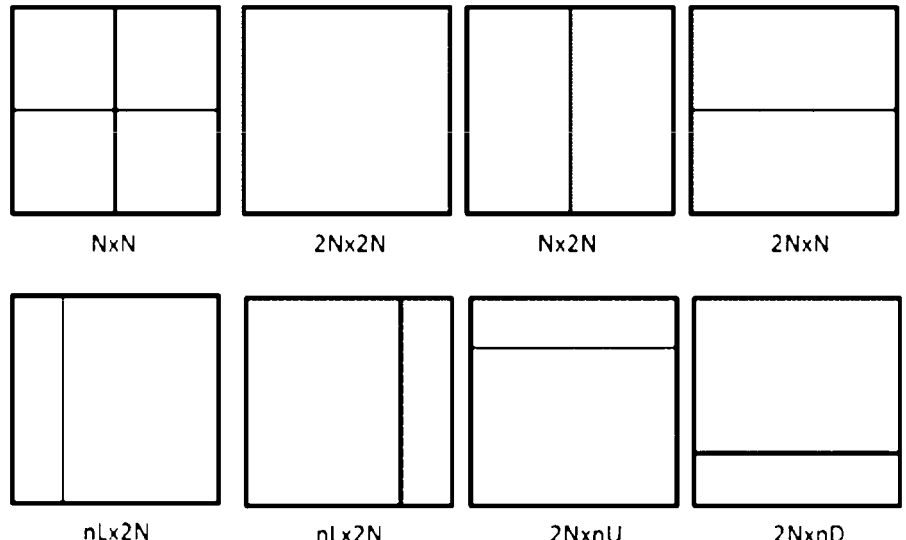
FIG. 2
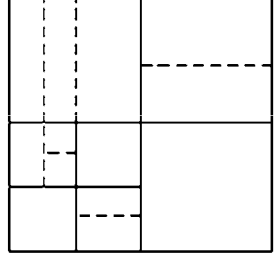
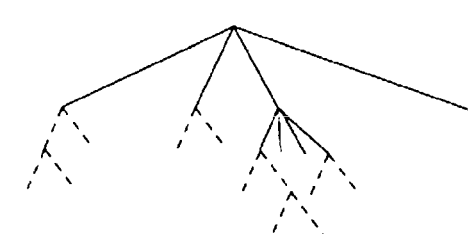
FIG. 3

SBTV

SBTH

STTV

STTH

Max Bt Size

CTU size = CtbSizeY

Max Tt Size

MaxMttDepth

MinQtSize

MinTtSize

MinCbSizeY = MinBtSize

MinQtSize

MinQtSize

110

Sh

Sv

| pic_parameter_set_rbsp( ) { | Descriptor |
|---|---|
| pps_pic_parameter_set_id | u(6) |
| pps_seq_parameter_set_id | u(4) |
| pps_mixed_nalu_types_in_pic_flag | u(1) |
| pps_pic_width_in_luma_samples | ue(v) |
| pps_pic_height_in_luma_samples | ue(v) |
| pps_ctu_grid_variable_flag | u(1) |
| if( pps_ctu_grid_variable_flag ) { | |
| pps_num_ctu_width_non_default | ue(v) |
| for(i=0;i<num_ctu_width_non_default;i++) { | |
| pps_non_default_ctu_col_idx[i] | ue(v) |
| pps_ctu_non_default_width[i] | ue(v) |
| } | |
| num_ctu_height_non_default | ue(v) |
| for(i=0;i<num_ctu_height_non_default;i++) { | |
| pps_non_default_ctu_row_idx[i] | ue(v) |
| pps_ctu_non_default_height[i] | ue(v) |
| } | |
| [...] | |
| } | |

FIG. 22

```
if(!pps_ctu_grid_variable_flag) {

PicWidthInCtbsY = Ceil( pps_pic_width_in_luma_samples ÷ CtbSizeY ) // as in VVC

PicHeightInCtbsY = Ceil( pps_pic_height_in_luma_samples ÷ CtbSizeY ) // as in VVC for ( i=0;i< PicWidthInCtbsY; i++ ) {
        ctuWidth[i] = CtbSizeY;
    }
    for ( i=0;i< PicHeightInCtbsY; i++ ) {
        ctuHeight[i] = CtbSizeY;
    }
}
Else {
    nonDefaultIdx=0
    i=0
    ctuPosX=0

While(ctuPosX < pps_pic_width_in_luma_samples){
        ctuWidth[i] = CtbSizeY;
        If( i== pps_non_default_ctu_col_idx[nonDefaultIdx] ) {
            ctuWidth[i] = pps_ctu_non_default_width[ nonDefaultIdx ];
            nonDefaultIdx ++;
        }
        ctuPosX += ctuWidth[i];
        i ++;
    }
    PicWidthInCtbsY = i ;

nonDefaultIdx=0 i=0 ctuPosY=0 while ( ctuPosY < pps_pic_height_in_luma_samples ) {
        ctuHeight[i] = CtbSizeY;
        If( i== pps_non_default_ctu_row_idx[nonDefaultIdx] ) {
            ctuHeight[i] = pps_ctu_non_default_height[ nonDefaultIdx ];
            nonDefaultIdx ++;
        }
        ctuPosY += ctuHeight[i];
        i ++;
    }
    PicHeightInCtbsY = i ;
}
```

FIG. 23

Communications channel

METHODS AND APPARATUS OF ENCODING/DECODING VIDEO PICTURE PARTITIONED IN CTU GRIDS

CROSS-REFERENCE TO RELATED APPLICATION

This application is a U.S. national phase application of International Application No. PCT/CN2023/077749, filed on Feb. 22, 2023, which claims priority to and benefits of EP patent application Ser. No. 22/305,407.3, filed on Mar. 31, 2022, the entire content of both of which is incorporated herein by reference.

FIELD

The present application generally relates to video picture encoding and decoding. Particularly, but not exclusively, the technical field of the present application is related to a partitioning video picture in CTU grids for encoding/decoding of video picture data into/from a bitstream.

BACKGROUND

The present section is intended to introduce the reader to various aspects of art, which may be related to various aspects of at least one exemplary embodiment of the present application that is described and/or claimed below. This discussion is believed to be helpful in providing the reader with background information to facilitate a better understanding of the various aspects of the present application. Accordingly, it should be understood that these statements are to be read in this light, and not as admissions of the prior art.

In the state-of-the-art video compression systems such as HEVC (ISO/IEC 23008-2 High Efficiency Video Coding, ITU-T Recommendation H.265, https://www.itu.int/rec/T-REC-H.265-202108-P/en) or VVC (ISO/IEC 23090-3 Versatile Video Coding, ITU-T Recommendation H.266, https://www.itu.int/rec/T-REC-H.266-202008-I/en, low-level and high-level picture partitioning are provided to divide a video picture into picture areas so-called Coding-Tree Units (CTU) which size may be typically between 8×8 and 64×64 pixels for HEVC and 32×32, 64×64, or 128×128 pixels for VVC.

SUMMARY

The following section presents a simplified summary of exemplary embodiments in order to provide a basic understanding of some aspects of the present application. This summary is not an extensive overview of an exemplary embodiment. It is not intended to identify key or critical elements of an exemplary embodiment. The following summary merely presents some aspects of exemplary embodiments in a simplified form as a prelude to the more detailed description provided elsewhere in the document.

According to a first aspect of the present application, there is provided a method for encoding a video picture into a bitstream of encoded video picture data. The method comprises encoding into the bitstream a default width and a default height of coding-tree unit of a grid of coding-tree units splitting the video picture into picture areas, each coding-tree unit being a picture area subdivided according to a coding tree; encoding, into the bitstream, a width of at least one coding-tree unit of the grid of coding-tree units different from the default width and/or a height of at least one coding-tree unit of the grid of coding-tree units different from the default height; obtaining encoded video picture data by encoding at least one coding unit of a coding tree associated with each coding-tree unit of the grid of coding-tree units; and writing the encoded video data into the bitstream.

According to a second aspect of the present application, there is provided a method of decoding a video picture from a bitstream of encoded video picture data. The method comprises decoding from the bitstream a default width and a default height of coding-tree unit of a grid of coding-tree units splitting the video picture into picture areas, each coding-tree unit being a picture area subdivided according to a coding tree; decoding, from the bitstream, a width of at least one coding-tree unit of the grid of coding-tree units different from the default width of coding-tree unit and/or a height of at least one coding-tree unit of the grid of coding-tree units different from the default height of coding-tree unit; obtaining a grid of coding-tree units based on the width of at least one coding-tree unit different from the default width and/or the height of at least one coding-tree unit different from the default height; obtaining video picture data by decoding at least one coding unit of a coding tree associated with each coding-tree unit of the grid of coding-tree units from the bitstream; and obtaining the video picture from said video picture data.

According to a third aspect of the present application, there is provided an apparatus comprising means for performing one of the method according to the first and/or second aspects of the present application.

According to a fourth aspect of the present application, there is provided a non-transitory storage medium carrying instructions of program code for executing a method according to the first and/or second aspects of the present application.

BRIEF DESCRIPTION OF THE DRAWINGS

Reference will now be made, by way of example, to the accompanying drawings which show exemplary embodiments of the present application, and in which:

FIG. 1 shows an example of coding-tree unit in accordance with HEVC;

FIG. 2 shows an example of partitioning coding units into prediction units in accordance with HEVC;

FIG. 3 shows an example of a CTU division in accordance with VVC;

FIG. 22 shows an example of a PPS (Picture Parameter Set) used for signaling a width of a CTU column and a height of a CTU row in accordance with at least one exemplary embodiment;

FIG. 23 shows an example of an algorithm used to obtain the spatial position of the top-left corner of a CTU of a CTU grid in accordance with at least one exemplary embodiment;

Similar or same elements are referenced with the same reference numbers.

DESCRIPTION OF EXEMPLARY EMBODIMENTS

Figures 4, 5, 6, 7:
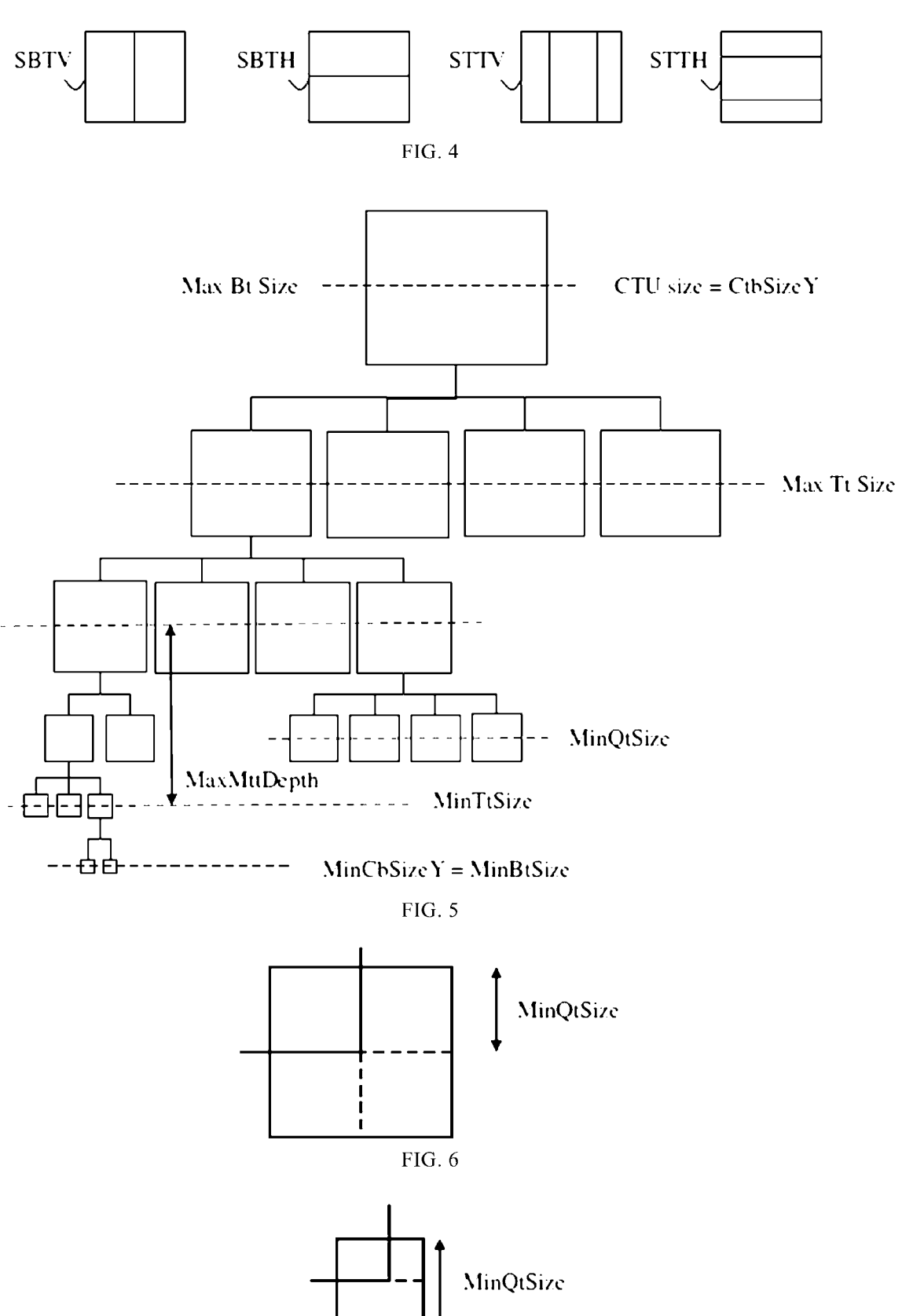
FIG. 4 shows examples of split modes supported in the multi-type tree partitioning in accordance with VVC.
FIG. 5 shows examples of coding parameters used to configure the coding-tree representation of CTU in accordance with VVC.
FIG. 6 shows an example illustrating rules for partitioning video picture borders.
FIG. 7 shows an example illustrating rules for partitioning video picture borders.

Exemplary embodiments are described hereinafter with reference to the accompanying figures. An exemplary embodiment may, however, be embodied in many alternate forms and should not be construed as limited to the examples set forth herein. Accordingly, it should be understood that there is no intent to limit exemplary embodiments to the particular forms disclosed. On the contrary, the disclosure is intended to cover all modifications, equivalents, and alternatives falling within the spirit and scope of the present application.

The CTU division of a video picture forms a grid of fixed size CTUs, namely a CTU grid, in which upper and left bounds spatially coincide with the top and left borders of the video picture.

The spatial position of a CTU in a CTU grid is determined from a CTU address ctuAddr defining a spatial position of the top-left corner of a CTU from an origin. As illustrated on FIG. 1, the CTU address may define the spatial position from the top-left corner of a higher-level spatial structure S containing the CTU. A coding tree is associated with each CTU to determine a tree-division of the CTU.

As illustrated on FIG. 1, in HEVC, the coding tree is a quad-tree division of a CTU, where each leaf is called a Coding Unit (CU). The spatial position of a CU in the video picture is defined by a CU index cuIdx indicating a spatial position from the top-left corner of the CTU. A CU is spatially partitioned into one or more Prediction Units (PU). The spatial position of a PU in the video picture VP is defined by a PU index puIdx defining a spatial position from the top-left corner of the CTU and the spatial position of an element of a partitioned PU is defined by a PU partition index puPartIdx defining a spatial position from the top-left corner of a PU. Each PU is assigned some intra or inter prediction parameters (prediction information). The intra or inter coding mode is assigned on the CU level. A CU may be also spatially partitioned into one or more Transform Units (TU), according to a quad-tree called the transform tree. Transform Units are the leaves of the transform tree. The spatial position of a TU in the video picture is defined by a TU index tuIdx defining a spatial position from the top-left corner of a CU. Each TU is assigned some transform parameters (prediction information). The transform type is assigned on the TU level, and 2D separate transform is performed at TU level during the coding or decoding of a picture block.

The PU Partition types existing in HEVC are illustrated on FIG. 2. They include square partitions (2N×2N and N×N), which are the only ones used in both Intra and Inter CUs, symmetric non-square partitions (2N×N, N×2N, used only in Inter CUs), and asymmetric Partitions (used only in Inter CUs). For instance, the PU type 2N×nU stands for an asymmetric horizontal partitioning of the PU, where the smaller partition lies on the top of the PU. According to another example, PU type 2N×nL stands for an asymmetric horizontal partitioning of the PU, where the smaller partition lies on the top of the PU.

As illustrated on FIG. 3, in VVC, the coding tree starts from a root node, i.e. the CTU. Next, a quad-tree (or quaternary tree) split divides the root node into 4 nodes corresponding to 4 sub-blocks of equal sizes (solid lines). Next, the quaternary tree (or quad-tree) leaves can then be further partitioned by a so-called multi-type tree, which involves a binary or ternary split according to one of 4 split modes illustrated on FIG. 4. These split types are the vertical and horizontal binary split modes, noted SBTV and SBTH and the vertical and horizontal ternary split modes SPTTV and STTH.

The leaves of the coding tree of a CTU are CU in the case of a joint coding shared by a luma and chroma component.

In intra video picture, i.e. video picture encoded without inter prediction, separated coding trees may be used, for luma component on one side and chroma components on the other side. The luma component part of a CTU is called a luma coding-tree block (luma CTB). A luma CTB is then associated with a coding tree, which leaves are associated to luma coding blocks. Furthermore, in the case of separated luma/chroma coding trees, in the case of a 3-components picture, the two chroma component parts of a CTU share a same coding tree called chroma coding-tree block (chroma CTB). A chroma CTB is then associated with a coding tree, which leaves are associated to chroma coding blocks.

Contrary to HEVC, in VVC, in most cases, CU, PU and TU have equal size, which means CUs are generally not partitioned into PUs or TUs, except in some specific coding modes.

Compared to HEVC, the block structures of VVC have increased flexibility, since a CU may be square or rectangular, and many rectangular block shapes are allowed. This increased flexibility of coding structure leads to approximately 15% increase in compression efficiency, i.e. 15% average bitrate reduction at equivalent picture quality.

FIG. 5 shows schematically examples of coding parameters used to configure a coding-tree partitioning in accordance with VVC.

The coding parameter CTU size refers to the root node size of a quaternary tree (or quad-tree). The coding parameter CtbSizeY refers to the size of a luma CTB. The coding parameter MinCbSizeY refers to a minimum allowed coded block size for luma (Y). The coding parameter MinQTSize refers to a minimum allowed quad-tree leaf size, the coding parameter MaxBtSize refers to a maximum allowed binary tree root node size, the coding parameter MaxTtSize refers to a maximum allowed ternary tree root node size, the coding parameter MaxMttDepth refers to a maximum allowed hierarchy depth of multi-type tree splitting from a quad-tree leaf, the coding parameter MinBtSize refers to a minimum allowed binary tree leaf size and the coding parameter MinTtSize refers to a minimum allowed ternary tree leaf size.

The size of a VVC-coded video picture is a multiple of 8. Thus, a video picture size may not consist in a set of entire CTUs, i.e. the video picture size may not be a multiple of 32, 64 or 128. In that case, some partial CTUs may exist on the bottom or the right side of the video picture. Some block partitioning rules are usually used to handle the block partitioning on the right and bottom video picture border.

In one exemplary embodiment of a block partitioning rule, if a tree node block (a block associated with a tree node) exceeds both the bottom and the right picture boundaries (FIG. 6), if the block is associated with a quad-tree (QT) node and the size of the block is larger than MinQTSize, QT split mode may be forced (dotted lines), otherwise, SBTH split mode may be forced (FIG. 7).

Figure 8:
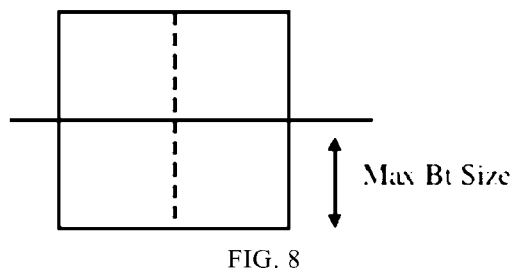
FIG. 8 shows an example illustrating rules for partitioning video picture borders.
Figure 9:
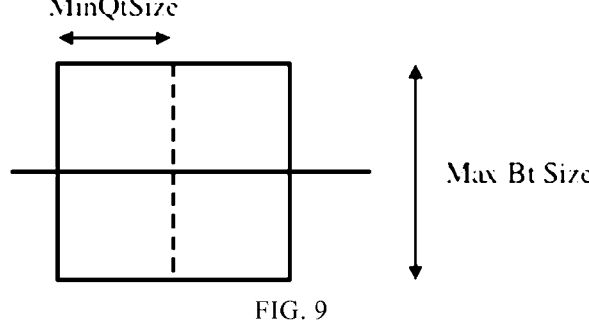
FIG. 9 shows an example illustrating rules for partitioning video picture borders.
Figure 10:
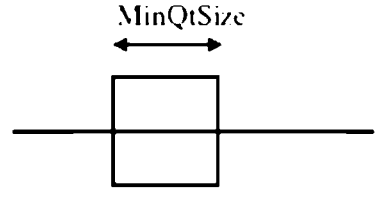
FIG. 10 shows an example illustrating rules for partitioning video picture borders.

If a tree node block exceeds either the bottom or the right video picture border, if the block is a quad-tree (QT) node, block size>MinQTSize, and block size>MaxBtSize, QT split may be forced (FIG. 8). Otherwise, if the block is a QT node and block size>MinQTSize and block size<=MaxBtSize, split may be forced, and the encoder may choose between QT or binary tree split with a forced boundary orientation (SBTH or SBTV) (FIG. 9). Otherwise (block is a multi-type tree node or size<MinQTSize), binary tree split may be forced in the picture boundary orientation (FIG. 10).

In VVC, a high-level picture partitioning is also provided in which, basically, a video picture may be partitioned into sub-pictures, slices, and tiles.

A tile is a sequence of CTUs that covers a rectangular picture area of a video picture. The CTUs in a tile are usually scanned in raster scan order within that tile.

A slice comprises an integer number of tiles or an integer number of consecutive complete CTU rows within a tile. Consequently, each vertical slice boundary is always also a vertical tile boundary. It is possible that a horizontal boundary of a slice is not a tile boundary but consists of horizontal CTU boundaries within a tile; this occurs when a tile is split into multiple rectangular slices, each of which consists of an integer number of consecutive complete CTU rows within the tile.

Two modes of slices are supported, namely the raster-scan slice mode and the rectangular slice mode. In the raster-scan slice mode, a slice contains a sequence of complete tiles in a tile raster scan order of a video picture. In the rectangular slice mode, a slice contains either a number of complete tiles that collectively form a rectangular picture area or several consecutive complete CTU rows of one tile that collectively form a rectangular picture area. Tiles within a rectangular slice are scanned in tile raster scan order within the rectangular picture area corresponding to that slice.

A sub-picture contains one or more slices that collectively cover a rectangular picture area. Consequently, each sub-picture boundary is also always a slice boundary, and each vertical sub-picture boundary is always also a vertical tile boundary.

One or both of the following conditions shall be fulfilled for each sub-picture and tile:

All CTUs in a sub-picture belong to the same tile.

All CTUs in a tile belong to the same sub-picture.

Figure 11:
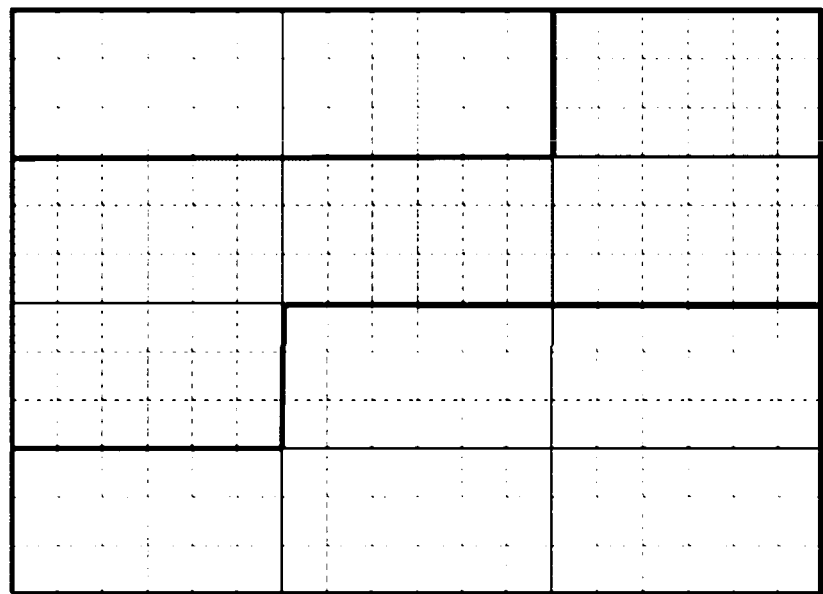
FIG. 11 shows an example of a video picture partitioning in the raster-scan slice mode.

FIG. 11 shows an example of a video picture partitioned with a 18×12 CTUs grid, 12 tiles of 6×3 CTUs each, and 3 raster-scan slices in the raster-scan slice mode (2 white shaded and 1 grey shaded).

Figure 12:
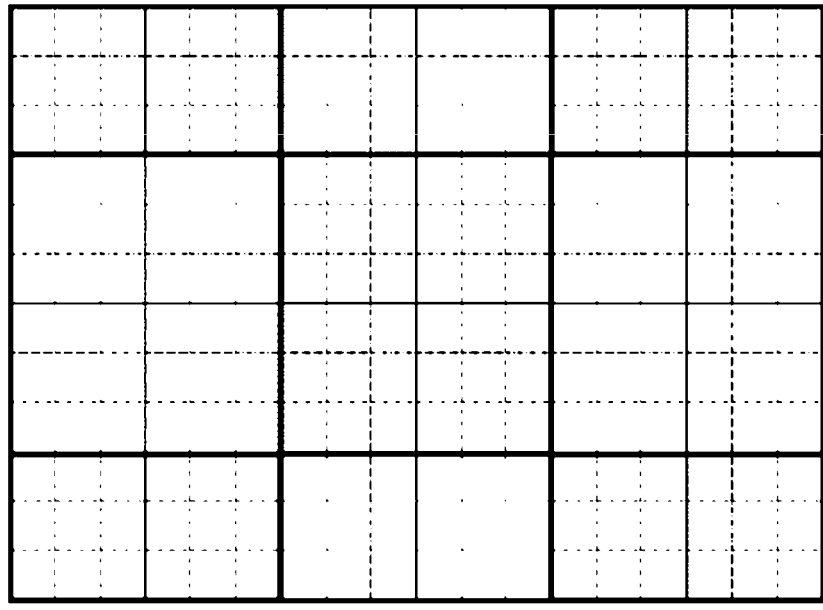
FIG. 12 shows an example of a video picture partitioning in the rectangular slice mode.

FIG. 12 shows an example of a video picture partitioned with a 18×12 CTUs grid, 24 tiles (6 tile columns of 3 CTUs width and 4 tile rows of 3 CTUs height) and 9 rectangular slices (4 white shaded and 5 grey shaded).

Figure 13:
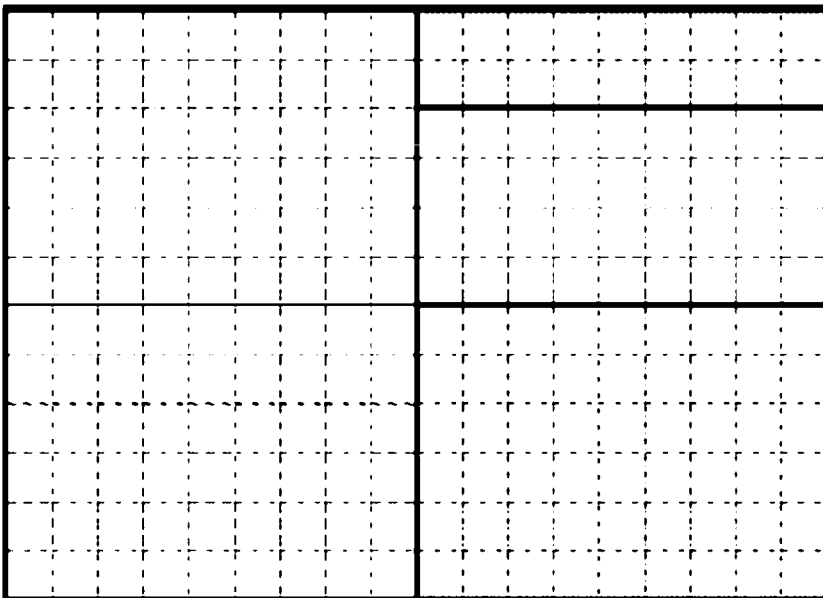
FIG. 13 shows an example of a video picture partitioned into tiles and rectangular slices.

FIG. 13 shows an example of a video picture partitioned with a 18×12 CTUs grid, 4 tiles (2 tile columns of 9×6 CTUs each) and 4 rectangular slices (2 white shaded and 2 grey shaded).

Figure 14:
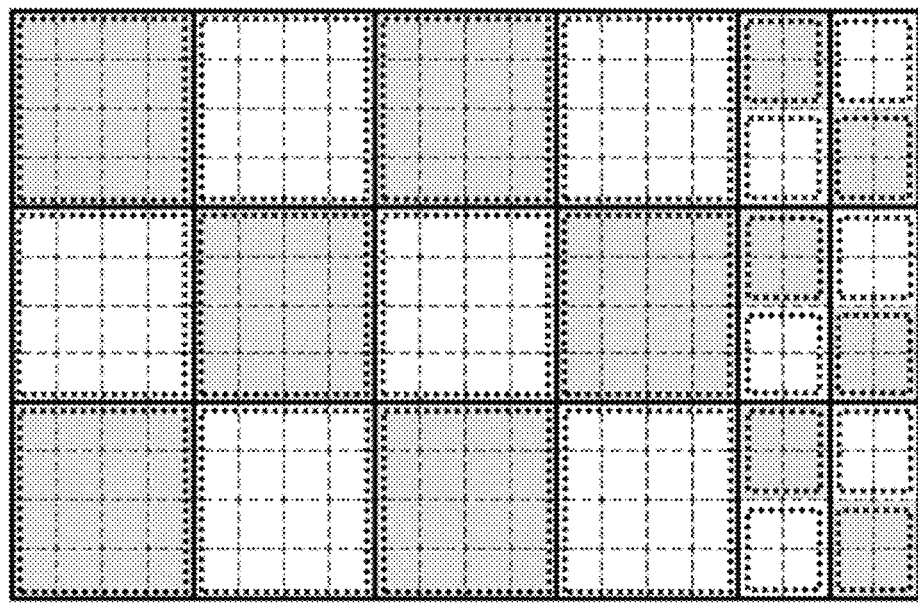
FIG. 14 shows an example of sub-picture partitioning of a video picture.

FIG. 14 shows an example of sub-picture partitioned with a 20×12 CTUs grid, 18 tiles (12 tiles each covering a slice of 4×4 CTUs, 6 tiles each covering 2 vertically-stacked slices of 2×2 CTUs) altogether resulting in 24 slices and 24 sub-pictures of varying dimensions (each slice is a sub-picture).

As above discussed, in VVC and HEVC, the CTU size (CTU width and CTU height) of all the CTUs of the CTU grid equals a same default CTU size (default CTU width CTU DW and default CTU height CTU DH) for all the CTUs of the CTU grid. Also, the CTU grid is aligned to the top and left borders of the video picture. Therefore, the CTU partitioning into CUs is designed to optimize the encoding of the video picture VP by adapting the CUs sizes and by aligning the CUs to spatial structures of the video picture VP, i.e. to maximise CU sizes in areas with homogenous content in terms of spatial activity. The goal is to optimize the coding efficiency, typically by means of large CUs covering low spatial activity picture areas and smaller CUs covering a high spatial activity picture area.

Figure 15:
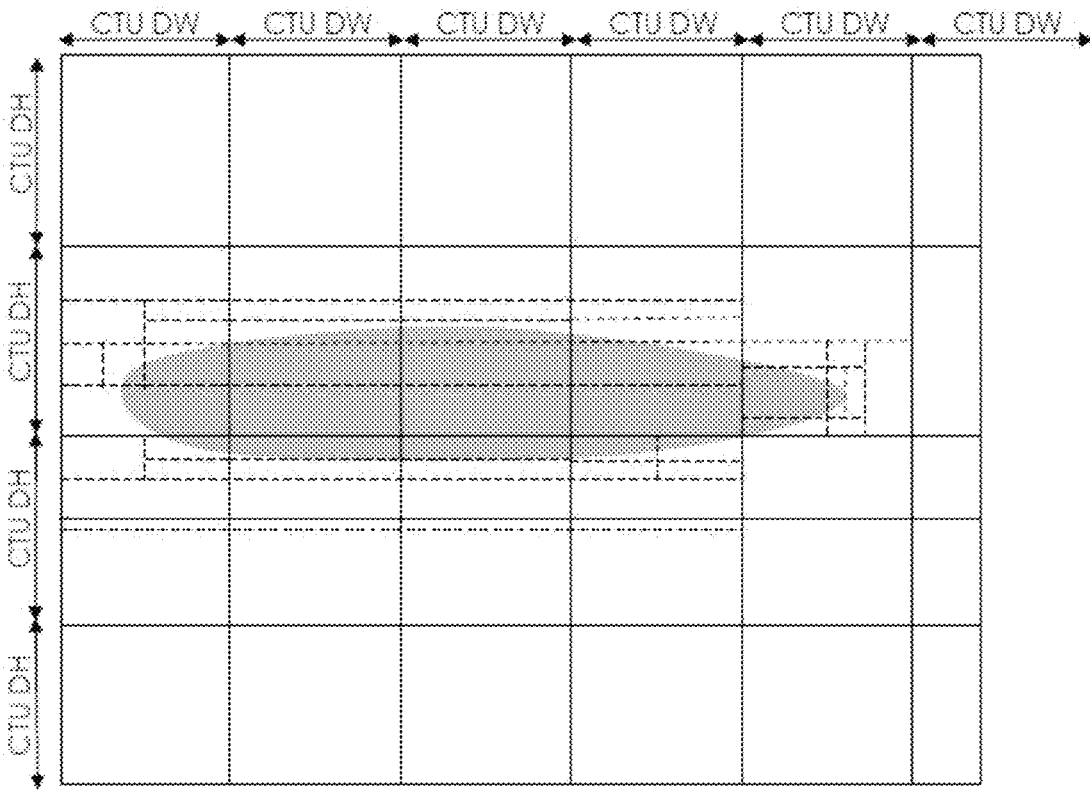
FIG. 15 shows an example of a fixed size CTU grid in accordance with prior art.

Some CTUs are likely to cover picture areas corresponding to both low and high spatial activities as illustrated on FIG. 15 which shows an example of a video picture comprising a grey shaded object on a white background. In this example, only CTUs covering high spatial activities of the video picture are partitioned into CUs (dotted lines). To optimize the CU partitioning of a CTU covering both a low and high spatial activity picture area, low spatial activity parts of the CTU must be coded with large CUs (blocks) and the number of CUs covering both low and high spatial activity must be low. To reduce the number of CUs covering both low and high spatial activity, small CUs are used. This leads to an increase of the number of CUs, in particular of small CUs containing a low spatial activity picture area and thus a potential lack of compression efficiency since it is generally more efficient to compress a low activity picture area with CUs (blocks) as large as possible.

Improving the flexibility of the representation of a CTU grid is required to improve the compression efficiency of a video picture but without increasing the number of CUs resulting of the partitioning of CTUs of the CTU grid.

At least one of the aspects generally relates to video picture encoding and decoding, one other aspect generally relates to transmitting a bitstream provided or encoded and one of other aspects relates to receiving/accessing a decoded bitstream.

At least one of the exemplary embodiments is described for encoding/decoding a video picture but extends to the encoding/decoding of video pictures (sequences of pictures) because each video picture is sequentially encoded/decoded as described below.

Moreover, the at least one exemplary embodiments are not limited to MPEG standards such as HEVC, VVC, AVC (ISO/IEC 14496-10 Advanced Video Coding for generic audio-visual services, ITU-T Recommendation H.264, https://www.itu.int/rec/T-REC-H.264-202108-P/en), EVC (ISO/IEC 23094-1 Essential video coding) but may be applied to other standards and recommendations such as AV1 (AOMedia Video 1, http://aomedia.org/av1/specification/) for example. The at least one exemplary embodiment may apply to pre-existing or future-developed, and extensions of any such standards and recommendations. Unless indicated otherwise, or technically precluded, the aspects described in the present application may be used individually or in combination.

A pixel corresponds to the smallest display unit on a screen, which can be composed of one or more sources of light (1 for monochrome screen or 3 or more for colour screens).

A video picture, also denoted frame or picture frame, comprises at least one component determined by a specific picture/video format which specifies all information relative to pixel values and all information, which may be used by a display unit and/or any other device to display and/or to decode video picture data related to said video picture.

A video picture comprises at least one component usually expressed in the shape of an array of samples.

A monochrome video picture comprises a single component and a color video picture may comprise three components.

For example, a color video picture may comprise a luma (or luminance) component and two chroma components when the picture/video format is the well-known (Y, Cb, Cr) format or may comprise three color components (one for Red, one for Green and one for Blue) when the picture/video format is the well-known (R, G, B) format.

Each component of a video picture may comprise a same number of samples which equals to a number of pixels of a screen on which the video picture is intended to be displayed.

Alternatively, in the case of a video format comprise a luma component and two chroma component like the (Y, Cb, Cr) format, dependent on the color format considered, the chroma component may contain half the number of samples in width and/or height, relative to the luma component.

A sample is the smallest visual information unit of a component composing a video picture. A sample value may be, for example a luma or chroma value or a colour value of a (R, G, B) format.

A pixel value is the value of a pixel of a screen. A pixel value may be represented by one sample for monochrome video picture and by multiple co-located samples for color video picture. Co-located samples associated with a pixel mean samples corresponding to the position of a pixel in the screen.

It is common to consider a video picture as being a set of pixel values, each pixel being represented by at least one sample.

A block of a video picture, namely a picture block, is a set of samples of one component of the video picture. A block of at least one luma sample or a block of at least one chroma sample may be considered when the picture/video format is the well-known (Y, Cb, Cr) format, or a block of at least one color sample when the picture/video format is the well-known (R, G, B) format.

The at least one exemplary embodiment is not limited to a particular picture/video format.

Generally speaking, the present application relates to encoding/decoding a video picture into/from a bitstream of encoded video picture data. On the encoding side, a default width and a default height of coding-tree unit of a grid of coding-tree units splitting the video picture into picture areas are encoded into the bitstream, each coding-tree unit being a picture area subdivided according to a coding tree. A width of at least one coding-tree unit of the grid of coding-tree units different from the default width and/or a height of at least one coding-tree unit of the grid of coding-tree units different from the default height of coding-tree units is/are encoded into the bitstream. Encoded video picture data is obtained by encoding at least one coding unit of a coding tree associated with each coding-tree unit of the grid of coding-tree units; and the encoded video data is written into the bitstream.

On the decoding side, a default width and a default height of coding-tree unit of a grid of coding-tree units splitting the video picture into picture areas are decoded from the bitstream of encoded video picture data, each coding tree unit being a picture area subdivided according to a coding tree. A width of at least one coding-tree unit of the grid of coding-tree units different from the default width of coding-tree unit and/or a height of at least one coding-tree unit of the grid of coding-tree units different from the default height of coding-tree unit is/are decoded from the bitstream of encoded video picture data. The grid of coding-tree units is obtained based on the width of at least one coding-tree unit different from the default width of coding-tree unit and/or the height of at least one coding-tree unit different from the default height of coding-tree unit. Video picture data is obtained by decoding at least one coding unit of a coding tree associated with each coding-tree unit of the grid of coding-tree units from the bitstream; and the video picture is obtained from said video picture data.

The present disclosure allows assigning particular values to width and/or height of CTU of the CTU grid during picture partitioning into CTUs. This improves flexibility of the representation of the CTU grid because width and/or height of CTU are determined to align CTU boundaries to spatial structures of the video picture. Such picture partitioning leads to CTUs that cover homogenous spatial activity picture areas and leads to a limited number of CUs resulting of CTU partitioning. Therefore, CUs, resulting of such CTU partitioning, may likely cover homogenous spatial activity picture areas. Also, assigning particular values to width and/or height (different of default width and/or default height) of CTUs of the CTU grid during picture partitioning, improves the compression efficiency of the video picture.

Figure 16:
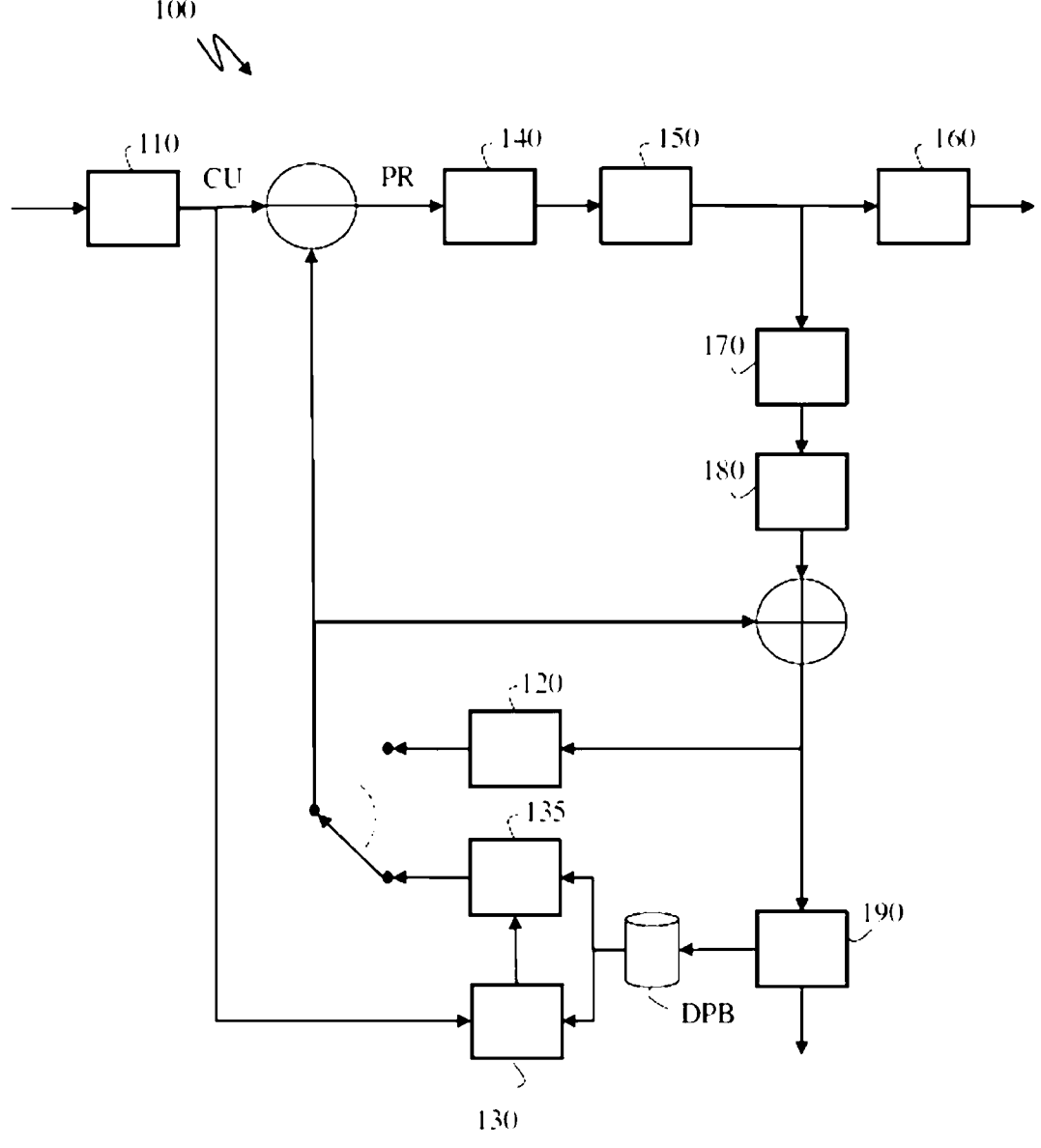
FIG. 16 shows a schematic block diagram of steps of a method 100 of encoding a video picture VP in accordance with at least one exemplary embodiment.
Figure 17:
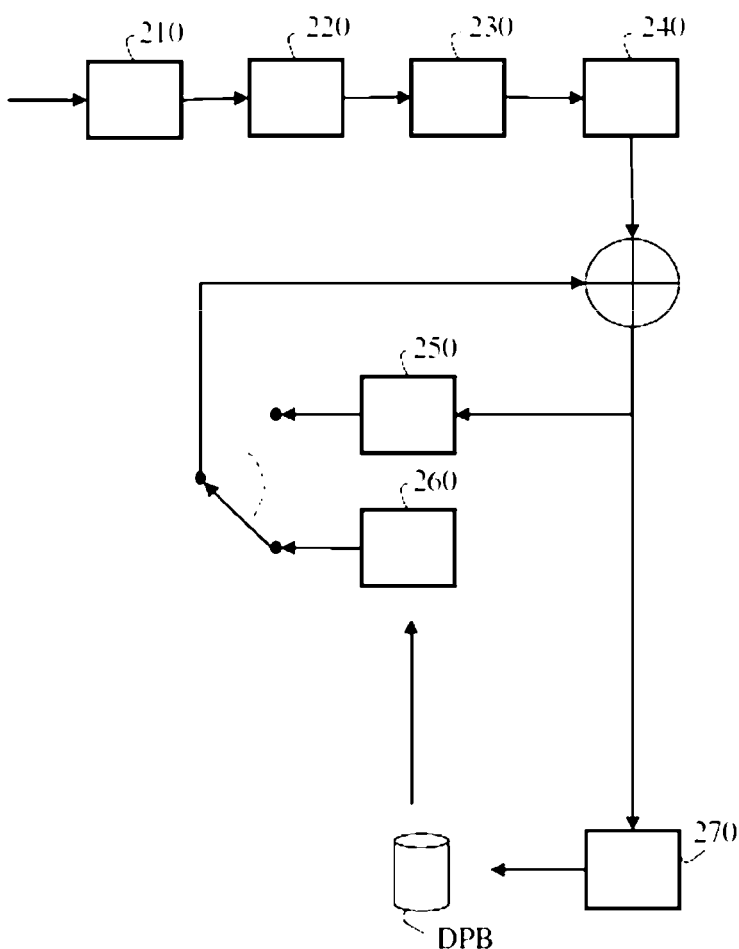
FIG. 17 shows a schematic block diagram of steps of a method 200 of decoding a video picture VP in accordance with at least one exemplary embodiment.

FIGS. 16 and 17 provide an overview of video encoding/decoding methods used in current video standard compression systems like VVC for example.

FIG. 16 shows a schematic block diagram of steps of a method 100 of encoding a video picture VP in accordance with the prior art.

In step 110, a video picture VP is partitioned into a CTU grid and partitioning information data is signaled into a bitstream B. A coding tree is associated with each CTU of the CTU grid, each CU of a coding tree associated with each CTU being a block of samples of the video picture VP. In short, a CU of a CTU is a block.

CTUs of the CTU grid are considered along a scanning order, usually a raster scan order of the video picture. Each block of a CTU is also considered along a scanning order, usually a raster scan order of blocks of the CTU.

Each block of each CTU is then encoded using either an intra or inter prediction coding mode.

Intra prediction (step 120) consists in predicting a current block by means of a predicted block based on already encoded, decoded and reconstructed samples located around the current block, typically on the top and on the left of the current block. Intra prediction is performed in the spatial domain.

In inter prediction mode, motion estimation (step 130) and motion compensation (135) are performed. Motion estimation searches, in one or more reference video picture(s) used to predictively encode the current video picture, a candidate reference block that is a good predictor of the current block. For instance, a good predictor of the current block is a predictor which is similar to the current block. The output of the motion estimation step 130 is one or more motion vectors and reference picture index (or indices) associated to the current block. Next, motion compensation (step 135) obtains a predicted block by means of the motion vector(s) and reference picture index (indices) determined by the motion estimation step 130. Basically, the block belonging to a selected reference picture and pointed to by a motion vector may be used as the predicted block of the current block. Furthermore, since motion vectors are expressed in fractions of integer pixel positions (which is known as sub-pel accuracy motion vector representation), motion compensation generally involves a spatial interpolation of some reconstructed samples of the reference picture to compute the predicted block samples.

Prediction information data is signaled in the bitstream B. The prediction information may comprise a prediction mode, prediction information coding mode, intra prediction mode or motions vector(s) and reference picture index (or indices) and any other information used for obtaining a same predicted block at the decoding side.

The method 100 selects one of the intra mode or the inter coding mode by optimizing a rate-distortion trade-off taking into account the encoding of a prediction residual block calculated, for example, by subtracting a candidate predicted block from the current block, and the signaling of prediction information data required for determining said candidate predicted block at the decoding side.

Usually, the best prediction mode is given as being the prediction mode of a best coding mode p* for a current block given by:

$$p^* = \underset{p \in P}{\mathrm{Argmin}}\{RD_{cost}(p)\} \qquad (1)$$

where P is the set of all candidate coding modes for the current block, p represents a candidate coding mode in that set, $RD_{cost}(p)$ is a rate-distortion cost of candidate coding mode p, typically expressed as:

$$RD_{cost(p)} = D(p) + \lambda.R(p).$$

D(p) is the distortion between the current block and a reconstructed block obtained after encoding/decoding the current block with the candidate coding mode p, R(p) is a rate cost associated with the coding of the current block with coding mode p, and $\lambda$ is the Lagrange parameter representing the rate constraint for coding the current block and typically computed from a quantization parameter used for encoding the current block.

The current block is usually encoded from a prediction residual block PR. More precisely, a prediction residual block PR is calculated, for example, by subtracting the best predicted block from the current block. The prediction residual block PR is then transformed (step 140) by using, for example, a DCT (discrete cosine transform) or DST (Discrete Sinus transform) type transform, and the obtained transformed coefficient block is quantized (step 150).

In variant, the method 100 may also skip the transform step 140 and apply quantization directly to the prediction residual block PR, according to the so-called transform-skip coding mode.

Quantized transform coefficient block (or quantized prediction residual block) is entropy encoded into the bitstream B (step 160).

Next, the quantized transform coefficient block (or the quantized residual block) is de-quantized (step 170) and inverse transformed (180) (or not), leading to a decoded prediction residual block. The decoded prediction residual block and the predicted block are then combined, typically summed, which provides the reconstructed block.

Other information data may also be entropy encoded for encoding a current block of the video picture VP.

In-loop filters (step 190) may be applied to a reconstructed picture (comprising reconstructed blocks) to reduce compression artefacts. Loop filter may apply after all picture blocks are reconstructed. For instance, they consist in deblocking filter, Sample Adaptive Offset (SAO) or adaptive loop filter.

The reconstructed blocks or the filtered reconstructed blocks form a reference picture that may be stored into a decoded picture buffer (DPB) so that it can be used as a reference picture for the encoding of a next current block of the video picture VP, or of a next video picture to encode.

FIG. 17 shows a schematic block diagram of steps of a method 200 of decoding a video picture VP in accordance with the prior art.

In step 210, partitioning information data, prediction information data and quantized transform coefficient block (or quantized residual block) are obtained by entropy decoding a bitstream B.

Partitioning information data defines a CTU grid (arrangement) over the video picture. The CTU grid splits the video picture VP into multiple CTUs. CTUs of the CTU grid are considered along a scanning order, usually a raster scan order of the video picture VP. Blocks of a considered CTU are also considered along a scanning order, usually a raster scan order of blocks of the CTU.

Other information data may also be decoded from the bitstream B for decoding a current block of a current CTU of CTU grid.

In step 220, each current block of a current CTU is entropy decoded.

Each decoded current blocks may be either a quantized transform coefficient block or a quantized prediction residual block.

In step 230, a current block (of a current CTU) is de-quantized and possibly inverse transformed (step 240), to obtain a decoded prediction residual block.

On the other hand, the prediction information data is used to predict the current block. A predicted block is obtained through its intra prediction (step 250) or its motion-compensated temporal prediction (step 260). The prediction process performed at the decoding side is identical to that of the encoding side.

Next, the decoded prediction residual block and the predicted block are then combined, typically summed, which provides a reconstructed block.

In step 270, in-loop filters may apply to a reconstructed picture (comprising reconstructed blocks) and the reconstructed blocks or the filtered reconstructed blocks form a reference picture that may be stored into a decoded picture buffer (DPB) as above discussed (FIG. 16).

In one exemplary embodiment of step 110, a grid of CTU may be determined to separate picture areas with low spatial activity from picture areas with high spatial activity of the video picture VP.

Figure 18:
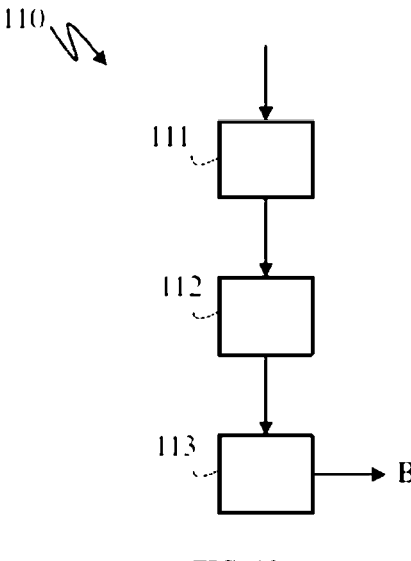
FIG. 18 shows schematic block diagram of step 110 in accordance with at least one exemplary embodiment.

In one exemplary embodiment of step 110, illustrated on FIG. 18, in step 111, the video picture content may be analyzed to determine picture areas with low and high spatial activity.

In one exemplary embodiment of step 111, the spatial activity of the video picture VP may be determined by detecting vertical and horizontal edges from the video picture content (sample values).

A picture area with low spatial activity means a picture area without (or with few) vertical or horizontal edges and a picture area with high spatial activity is a picture area with more horizontal and vertical edges than in a low spatial activity picture area.

For example, each pixel of the video picture may be categorized as being either an edge sample or not, and a picture area is considered as having a low spatial activity if the number of edge samples of said picture area is lower than a threshold.

In one exemplary embodiment of step 111, vertical and horizontal edges of the video picture may be detected by applying horizontal and vertical Sobel filters on the video picture VP. These Sobel filters have a very low complexity and are well adapted for tasks such as detecting horizontal and vertical edges from a picture content.

Figure 19:
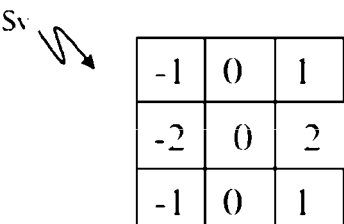
FIG. 19 shows examples of edge detection filters in accordance with at least one exemplary embodiment.

FIG. 19 shows an example of coefficients of a horizontal Sobel filter Sh and an example of coefficients of a vertical Sobel Filter Sv.

The present disclosure is not limited to a particular edge detecting but extends to any other well-known method for detecting edges in a picture such as well-known Canny filter or any gradient-based edge detection method for example.

In variant, a post-edge detection filter may discard short edges possibly with a threshold, possibly based on a size related to the width, height of the video picture or the CTU size (height and/or width).

This variant is advantageous because only a limited number of vertical or horizontal edges are considered for determining at least one CTU size.

In step 112, a CTU grid (CTU arrangement) is determined to separate the picture areas with low spatial activity from picture areas with high spatial activity based on the analysis of the video picture VP.

This leads to obtain CTUs of the CTU grid with particular width (different from a default CTU width CTU DW) and/or CTU of the CTU grid with particular height (different of a default CTU height CTU DH).

The resulting CTU grid comprises CTU that cover the most possibly homogeneous picture areas that will be better predicted (and so better compression efficiency).

In one exemplary embodiment of step 112, CTU boundaries of the CTU grid may be aligned with determined principal vertical and horizontal edges.

A vertical or horizontal edge is a separation between two sets of pixels, the pixels of each set sharing particular picture properties. A vertical or horizontal edge also refers to an edge, which is approximately vertical or horizontal, i.e. an edge having an angle around +/−15 degrees from a vertical or horizontal line.

In one exemplary embodiment of step 112, a CTU boundary of the CTU grid may be aligned with a vertical or horizontal edge by minimizing a spatial distance between said CTU boundary and said vertical or horizontal edge. It is noted that the distance is measured orthogonally to an edge direction. When a distance between a CTU boundary and a vertical (respectively horizontal) edge exceeds the default CTU width CTU DW (respectively the default CTU height CTU DH) then a new CTU column (respectively CTU row) is added to the CTU grid with the default CTU width CTU DH (respectively default CTU width CTU DW). When a distance between a CTU boundary and a vertical (respectively horizontal) edge is lower than a threshold, e.g. null, then a new CTU boundary is added to complete a CTU column (respectively CTU row) of the CTU grid. The new completed CTU column (respectively row) has a width MW (respectively a height MH) equals to the distance between the CTU boundary parallel to the new added CTU boundary.

In one exemplary embodiment of step 112, the height of a given CTU row may be chosen as follows. Let $a(x,y)$ denote the spatial activity measures at luma sample position $(x,y)$, $a(x,y)$ may for instance be measured through an edge detection filtering like the above-discussed Sobel filtering, or a morphological gradient computation, or a 2D gradient magnitude at spatial position $(x,y)$. Let $H_O, \ldots, H_N$ be the possible height values, ranked in the growing height order, that can be assigned to the current CTU row. The selection process may select the height of the CTU row according to the average spatial activity in the CTU row. First, the average spatial activity in the potential CTU of height $H_0$ may be computed and compared to a threshold. If higher than the threshold, the potential CTU with height $H_0$ is of high spatial activity. Otherwise, it is of low spatial activity.

In a given strategy, if the CTU row with minimum height $H_0$ is of high average spatial activity, then the CTU row is given the minimum height $H_0$. Otherwise, i.e. if the potential CTU row with height $H_0$ is of low average spatial activity, then the CTU row of next candidate height $H_1$ is considered, and its average spatial activity is measured. The process then determines the maximum candidate CTU row height for which the average spatial activity is measured as low.

A similar strategy may further be employed to select the width of successive CTU columns.

This "growing CTU size" strategy leads to the choice of CTU rows such that low spatial activity picture areas are represented with CTUs as large as possible, which is the intent of the proposed method.

Alternatively, if the CTU row with minimum candidate height is of high measured spatial activity, then the maximum candidate height such that the considered CTU row is also of high spatial activity may be chosen. This other strategy would ensure that maximum CTU sizes are used for the compression, under the constraint that homogeneous CTU rows in terms of spatial activity are coded. Similar strategy would then apply to the choice of the width of CTU columns.

In step 113, a width MW of at least one CTU different of the default width CTU DW and/or a height MH of at least one CTU different of the default height CTU DH is/are encoded into the bitstream B.

In one exemplary embodiment of step 113, only some widths MW of CTUs among the widths of CTUs different of a default width CTU DW and/or only some heights MH of CTUs among the heights of CTUs different of the default height CTU DH may be encoded into the bitstream.

In one exemplary embodiment of step 113, a single CTU height of each CTU row and/or a single CTU width of each CTU column of the CTU grid may be encoded into the bitstream B.

This exemplary embodiment implies that all CTUs of a CTU row have the same height and all the CTUs of a CTU column have the same width.

This exemplary embodiment limits extra coding cost introduced for signalling the height and/or width of CTU rows/columns into the bitstream B and keeps the CTU scanning process manageable for the coding and decoding of each video picture.

Figure 20:
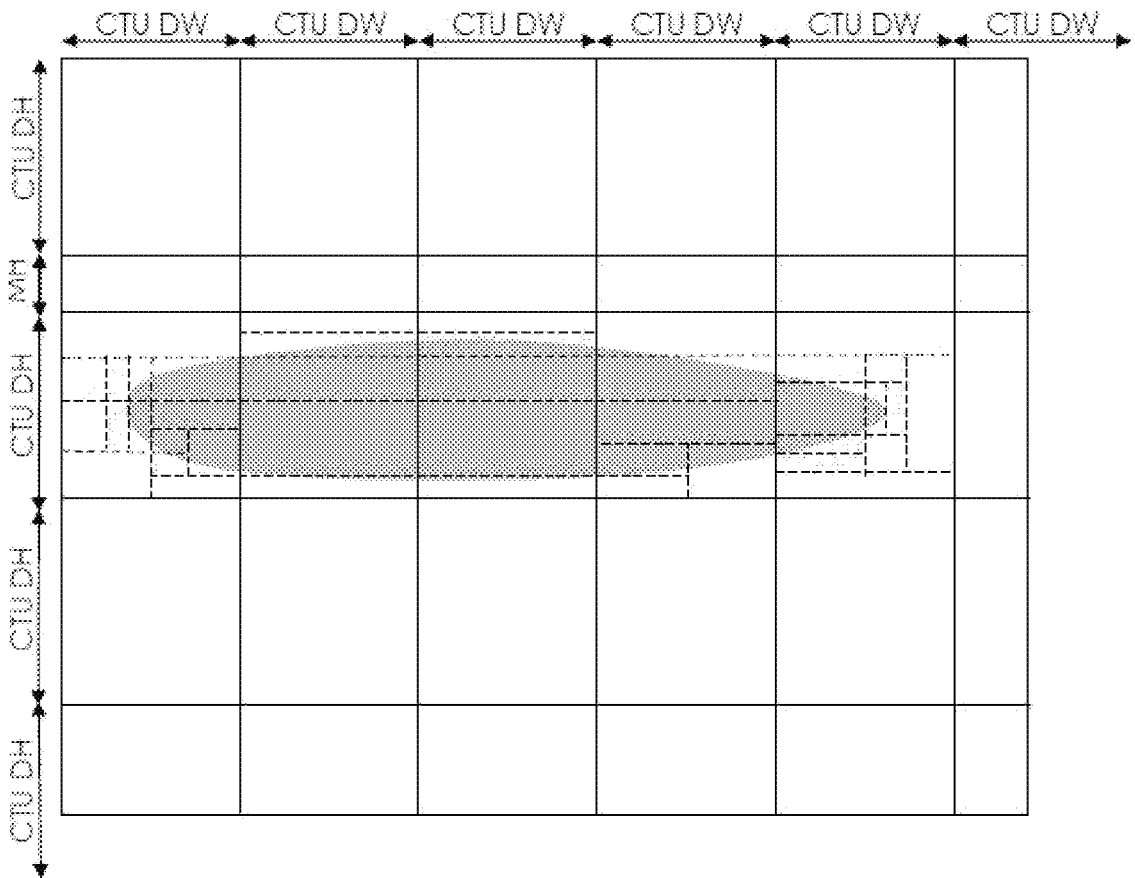
FIG. 20 shows an illustrated example of a video partitioning in accordance with one exemplary embodiment of step 110.

An illustrated example of a video picture partitioning according to the examplary embodiment of step 110 is given by FIG. 20, where the second CTU row is assigned a particular CTU height MH different from the default height value CTU DH usually signaled as in VVC. The height of the second row is thus adjusted to the spatial activity of the video picture VP and this second CTU row is only composed of low spatial activity areas compared to the second CTU row of FIG. 15. The object boundaries to code are spatially enclosed to a reduced number of CTUs compared to the second CTU row of FIG. 15. Thus the partitioning of large spatial areas into small CUs, needed to code the object boundaries, happens in a reduced number of CUs compared to the prior art. Such a CTU grid (arrangement) allows to get large low spatial activity areas and reduces the total number of CUs for partitioning the video picture VP compared to the prior art, improving compression efficiency of the video picture VP.

Figure 21:
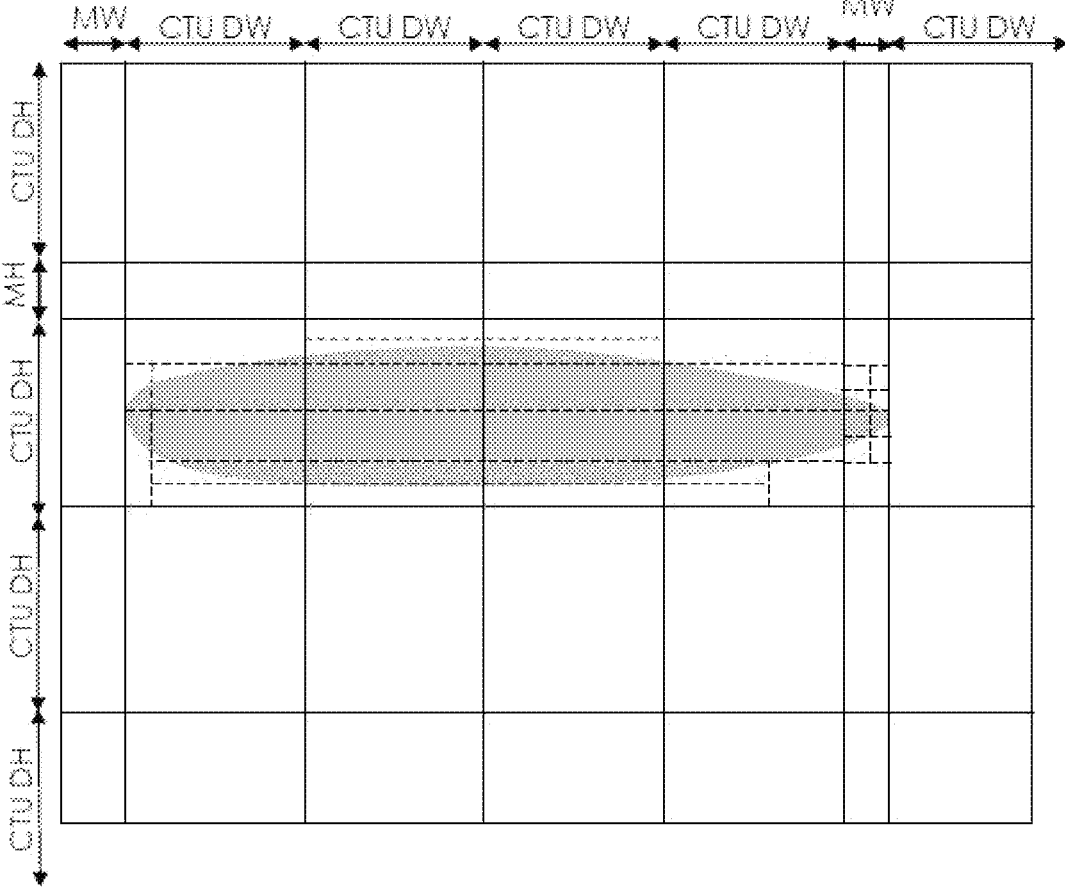
FIG. 21 shows another illustrated example of a video partitioning in accordance with one exemplary embodiment of step 110.

Another illustrated example of a video picture partitioning according to the examplary embodiment of step 110 is given by FIG. 21. Here the second CTU row is assigned a particular CTU height MH, as well as the first and sixth CTU columns which are assigned particular CTU widths MW different from the default height value CTU DW usually signaled such in VVC. Consequently, the object boundaries to code are spatially enclosed to a further reduced number of CTUs compared to the second CTU row of FIG. 15. This way leads to CTUs which are partitioned into a minimum number of small CUs compared to FIGS. 15 and 20, leading to further improved compression efficiency of the video picture VP.

For example, the default CTU size (default CTU height, default CTU width) may equal to 256 (CTU DW=CTU DH=256) and variable CTU sizes MH, MW may equal to 8, 16, 32 or 64.

The presentation disclosure is not limited to any particular CTU size.

In one exemplary embodiment of step 113, a default CTU size value (height, width) may be encoded into the bitstream B, for example at a sequence level.

For example, as in VVC, a syntax element sps_log 2_ctu_size_minus5 may be signalled in the bitstream B and the default CTU size value (equals to the luma CTB Ctb-SizeY) may be derived as:

$$CtbLog2SizeY = sps\_log2\_ctu\_size\_minus5 + 5$$

$$CtbSizeY = 1 \ll CtbLog2SizeY$$

In one exemplary embodiment of step 113, illustrated on FIG. 22, the widths of CTU columns and the heights of the CTU rows may be encoded as syntax elements in the so-called Picture Parameter Set syntax structure of VVC denoted Pic_Parameter_Set (PPS).

In one exemplary embodiment of step 113, PPS may comprise a syntax element, e.g. a flag denoted pps_ctu_grid_variable_flag, indicating if a width of at least one CTU column is different of the default CTU width CTU DW or if a height of at least one CTU row of the CTU grid is different of the default CTU height CTU DH.

If the flag pps_ctu_grid_variable_flag indicates that a width of a CTU column is different of the default CTU width or a height of a CTU row of the CTU grid is different of the default CTU height CTU, a syntax element pps_num_c-tu_width_non_default indicates a number of CTU columns having a width MW different of the default width CTU DW. PPS further comprises a 1D array pps_non_default_ctu_col_idx which element pps_non_default_ctu_col_idx[i] indicates a CTU index associated with a CTU column having a width MW different of the default width CTU DW and a 1D array pps_ctu_non_default_width which element pps_ctu_non_default_width[i] indicates a width MW different of the default width CTU DW. PPS further comprises a 1D array pps_non_default_ctu_row_idx which element pps_non_default_ctu_row_idx[i] indicates a CTU index associated with a CTU having a height MH different from the default height CTU DH and a 1D array pps_ctu_non_default_height which element pps_ctu_non_default_height[i] indicates a height MH different from the default width value.

In some variant of this exemplary embodiment, the CTU row height and/or CTU column width may be signaled (encoded/decoded into/from the bitstream B) in syntax structures different from the picture parameter set, like a picture header, a slice header, or an adaptation parameter set (APS).

As discussed above in relation with FIG. 16, each CTU of the CTU grid is considered along a scanning order for encoding their CUs.

For each considered CTU in FIG. 16, the spatial position of the top left corner of the considered CTU are computed as follows.

Firstly, some parameters are computed at the encoding and decoding sides. One of these parameters is an integer number equals to a number of CTU columns per picture PicWidthInCtbsY. Another one is a 1D array ctuWidth which element ctuWidth[i] (i=0; PicWidthInCtbsY−1) equals to a width of CTUs in each CTU column. Another one is an integer parameter equals to a number of CTU rows per picture PicHeightInCtbsY. Another one is a 1D array ctuHeight which element ctuHeight[i] (i=0; PicWHeight-InCtbsY−1) equals to a height of CTUs in each CTU column. Others are a number of samples of the width of the video picture VP denoted pps_pic_width_in_luma_samples and a number of samples of the height of the video picture VP denoted pps_pic_heigth_in_luma_samples.

Those parameters are derived from the algorithm shown on FIG. 23. In brief, If the flag pps_ctu_grid_variable_flag indicates that all the CTUs of the CTU grid have widths and heights equal to default values, the parameters PicWidthInCtbsY, PicHeightInCtbsY, ctuWidth[i] and ctuHeight are derived as in VVC as follows.

$$PicWidthInCtbsY = \text{Ceil}(pps\_pic\_width\_in\_luma\_samples \div CtbSizeY)$$

$$PicHeightInCtbsY = \text{Ceil}(pps\_pic\_height\_in\_luma\_samples \div CtbSizeY)$$

$$ctuWidth[i] = ctuHeight[i] = CtbSizeY \qquad 5$$

where Ceil(x) is a function that returns the smallest integer value greater than or equal to x.

If the flag pps_ctu_grid_variable_flag equals to 1 to indicate that a width of a CTU column is different of the default CTU width or a height of a CTU row of the CTU grid is different from the default CTU height CTU, each ctuWidth[i] (ctuWidth[i]) element equals a default value (CtbSizeY) if the index i does not equal pps_non_default_ctu_col_idx[nonDefaultIdx] and equals to the parameter pps_ctu_non_default_width[nonDefaultIdx] (equals to CTU DW or CTU DH) otherwise, wherein nonDefaultIdx is an internal index.

The CTU grid may comprise only CTUs with same widths and same heights. Only CTU with different widths and/or heights may contain both CTUs having widths and/or heights equal to a default value and other having widths and/or heights different of default values.

Furthermore, as in VVC, the total number of CTUs in a picture PicSizeInCtbsY is calculated the same as in VVC specification, that is:

$$PicSizeInCtbsY = PicWidthInCtbsY * PicHeightInCtbsY$$

Secondly, based on the above derived parameters, the x- and y-indices CtbAddrX and CtbAddrY of a considered CTU address is derived as in VVC as:

$$CtbAddrX = (CtbAddrInRs \ \% \ PicWidthInCtbsY)$$

$$CtbAddrY = (CtbAddrInRs / PicWidthInCtbsY)$$

where % means modulo function, CtbAddrInRs is a luma CTB address associated with the considered CTU and is assigned to each CTU according to a raster scanning order of CTUs in the picture.

Spatial coordinates xCtb and yCtb of the luma CTB associated with the considered CTU are obtained as follows.

If the flag pps_ctu_grid_variable_flag equals to 1 to indicate that all the CTU of the CTU grid have widths and heights equal to default values (CtbSiseY), then the spatial coordinates xCtb and yCtb are calculated as in VVC, by:

$$xCtb = CtbAddrX \ll CtbLog2SizeY$$

$$yCtb = CtbAddrY \ll CtbLog2SizeY$$

where CtbLog 2SizeY means logarithm to the base 2 of CtbSizeY, and << is the bitwise left shift operator.

If the flag pps_ctu_grid_variable_flag indicates that a width of a CTU column is different of the default CTU width or a height of a CTU row of the CTU grid is different of the default CTU height CTU, then the spatial coordinates xCtb and yCtb are calculated by:

$$xCtb = \sum_{i=0}^{CtbAddrX-1} ctuWidth[i] \qquad 65$$

-continued $$yCtb = \sum_{i=0}^{CtbAddrY-1} ctuHeight[i]$$

Moreover, for a CTB raster scan address CtbAddrInRs of the CTB associated with the considered CTU, the width currCtbWidth and the height currCtbHeight of this current CTB are given by:

currCtbWidth=ctuWidth[CtbAddrX]=ctuWidth[(CtbAddrInRs % PicWidthInCtbsY)]

currCtbHeight=ctuHeight[CtbAddrY]=ctuHeight[(CtbAddrInRs/PicWidthInCtbsY)]

In accordance with the present disclosure, a width and/or height of CTU of the CTU grid encoded into the bitstream B may not be a multiple of CU widths and CU heights supported by an encoder. For instance, supported CTU widths and CTU heights 92, 48, 24 may be used.

In one exemplary embodiment of step 110, a CU partitioning rule may be used to handle CU partitioning on the right and bottom of the CTUs of the CTU grid. Said CU partitioning rules are quite the same as the block partitioning rules above discussed for VVC in relation with FIGS. 6 to 10.

In one exemplary embodiment of CU partitioning rule, if the CU size>MinQTSize, and CU size>MaxBtSize, the CU may be considered as a QT node and QT split may be forced. Otherwise, if CU size>MinQTSize and CU size<=MaxBtSize, split may be forced, and the encoder chooses between QT and binary tree split in the horizontal (SBTH). Otherwise (size<MinQTSize), BT spit may be forced in the horizontal direction.

Then the same above policy is recursively applied to sub-CUs resulting from the CTU split, and which do overlap the lower border of the considered CTU.

The case of a CTU width not equal to a supported CU size is similar to the above policy and is easily deduced from it.

Figures 24, 25, 26:
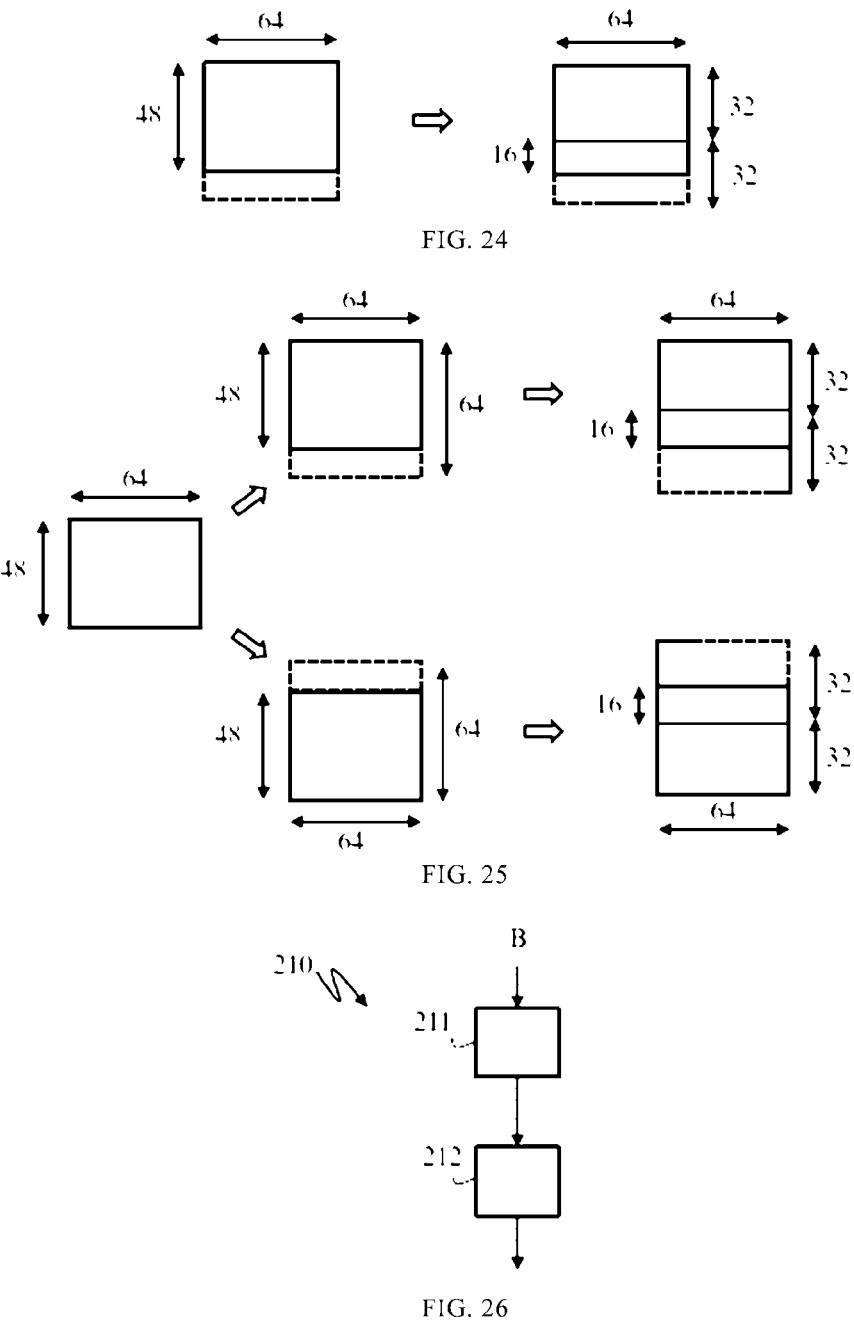
FIG. 24 shows an example of CU partitioning in accordance with at least one exemplary embodiment.
FIG. 25 shows an example of CTU alignment in accordance with at least one exemplary embodiment.
FIG. 26 shows schematic block diagram of step 210 in accordance with at least one exemplary embodiment.

As an example, illustrated on FIG. 24, if a CTU height is 48, the CU that serves as the root node of the coding-tree associated with said CTU is supported size 64. Next, the lower border of the CTU is considered as if it was the lower bound of the video picture VP. This means CU splitting is forced until only entire CUs are contained in the considered CTU. Here, the CU is split into a first 64×32 sub-CU and a second 64×16 sub-CU.

In one exemplary embodiment of step 110, the encoder may choose how to align a supra-CU that represents a coding-tree root node of a coding-tree associated with a CTU, relative to the CTU boundaries.

For instance, if the CTU height is not a CU height supported by the encoder, the encoder chooses between aligning the supra-CU to the top boundary of the CTU or to the bottom boundary of the CTU as illustrated on FIG. 25.

The advantage of such exemplary embodiment is that the encoder may find the most optimal coding-tree arrangement in term of compression efficiency, leading to better coding efficiency than previous exemplary embodiments.

In variant of the last exemplary embodiment of step 110, a syntax element (typically a 2-bit syntax element) may be encoded into the bitstream B to indicate the way the supra-CU is aligned relatively to the CTU boundaries (either to the top, bottom, left or right boundary of the CTU).

In variant, a CU partitioning may apply on an aligned CTU of the CTU grid as illustrated on FIG. 25.

FIG. 26 shows schematic block diagram of step 210 in accordance with at least one exemplary embodiment.

A default height CTU DH and a default width CTU DW may be decoded from the bitstream B.

In step 211, a width of at least one CTU of a CTU grid different from the default width CTU DW and/or a height of at least one CTU of a CTU grid different from the default height CTU DH is/are decoded from a bitstream B. The CTU grid splits the video picture VP into picture areas, each coding-tree unit being a picture area subdivided according to a coding tree.

In one exemplary embodiment of step 211, only some widths MW of CTUs among the widths of CTUs different of a default width CTU DW and/or only some heights MH of CTUs among the heights of CTUs different of the default height CTU DH may be decoded from the bitstream B.

In one exemplary embodiment of step 211, a single height of each coding-tree unit row and/or a single width of each coding-tree unit column of the grid of coding-tree units may be decoded from the bitstream B.

In one exemplary embodiment of step 211, the widths of CTU columns and the heights of the CTU rows may be decoded as a syntax element PPS of FIG. 22 and the CTU row and CTU column sizes (heights and widths) are derived as above discussed in relation with an exemplary embodiment of step 113.

In one exemplary embodiment of step 211, PPS may comprise a syntax element pps_ctu_grid_variable_flag, indicating if a width of at least one CTU column is different of the default CTU width CTU DW or if a height of at least one CTU row of the CTU grid is different of the default CTU height CTU DH.

In one exemplary embodiment of step 211, a syntax element (typically a flag) may be decoded from the bitstream B indicating if the supra-CU is aligned either to the top or the bottom of a CTU, and the CTU grid may be obtained taking into account said aligned supra-CU.

In step 212, a CTU grid is obtained based on the width of at least one coding-tree unit different from the default width and/or the height of at least one coding-tree unit different from the default height.

Figure 27:
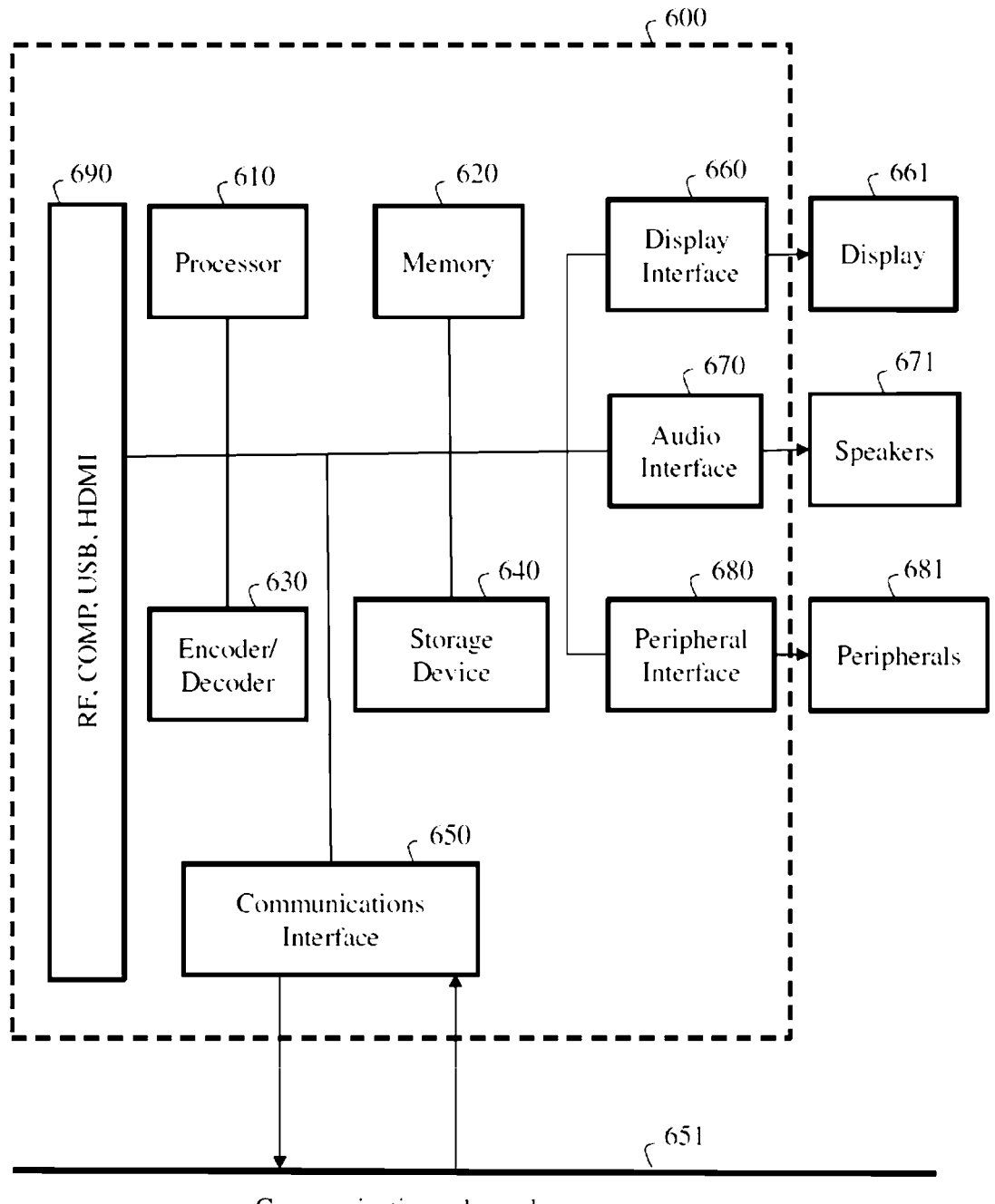
FIG. 27 illustrates a schematic block diagram of an example of a system in which various aspects and exemplary embodiments are implemented.

FIG. 27 shows a schematic block diagram illustrating an example of a system 600 in which various aspects and exemplary embodiments are implemented.

System 600 may be embedded as one or more devices including the various components described below. In various embodiments, system 600 may be configured to implement one or more of the aspects described in the present application.

Examples of equipment that may form all or part of the system 600 include personal computers, laptops, smartphones, tablet computers, digital multimedia set top boxes, digital television receivers, personal video recording systems, connected home appliances, connected vehicles and their associated processing systems, head mounted display devices (HMD, see-through glasses), projectors (beamers), "caves" (system including multiple displays), servers, video encoders, video decoders, post-processors processing output from a video decoder, pre-processors providing input to a video encoder, web servers, video servers (e.g. a broadcast server, a video-on-demand server or a web server), still or video camera, encoding or decoding chip or any other communication devices. Elements of system 600, singly or in combination, may be embodied in a single integrated circuit (IC), multiple ICs, and/or discrete components. For example, in at least one embodiment, the processing and encoder/decoder elements of system 600 may be distributed across multiple ICs and/or discrete components. In various embodiments, system 600 may be communicatively coupled to other similar systems, or to other electronic devices, via, for example, a communications bus or through dedicated input and/or output ports.

System 600 may include at least one processor 610 configured to execute instructions loaded therein for implementing, for example, the various aspects described in the present application. Processor 610 may include embedded memory, input output interface, and various other circuitries as known in the art. System 600 may include at least one memory 620 (for example a volatile memory device and/or a non-volatile memory device). System 600 may include a storage device 640, which may include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random-Access Memory (DRAM), Static Random-Access Memory (SRAM), flash, magnetic disk drive, and/or optical disk drive. The storage device 640 may include an internal storage device, an attached storage device, and/or a network accessible storage device, as non-limiting examples.

System 600 may include an encoder/decoder module 630 configured, for example, to process data to provide encoded/decoded video picture data, and the encoder/decoder module 630 may include its own processor and memory. The encoder/decoder module 630 may represent module(s) that may be included in a device to perform the encoding and/or decoding functions. As is known, a device may include one or both encoding and decoding modules. Additionally, encoder/decoder module 630 may be implemented as a separate element of system 600 or may be incorporated within processor 610 as a combination of hardware and software as known to those skilled in the art.

Program code to be loaded onto processor 610 or encoder/decoder 630 to perform the various aspects described in the present application may be stored in storage device 640 and subsequently loaded onto memory 620 for execution by processor 610. In accordance with various embodiments, one or more of processor 610, memory 620, storage device 640, and encoder/decoder module 630 may store one or more of various items during the performance of the processes described in the present application. Such stored items may include, but are not limited to video picture data, information data used for encoding/decoding video picture data, a bitstream, matrices, variables, and intermediate or final results from the processing of equations, formulas, operations, and operational logic.

In several embodiments, memory inside of the processor 610 and/or the encoder/decoder module 630 may be used to store instructions and to provide working memory for processing that may be performed during encoding or decoding.

In other embodiments, however, a memory external to the processing device (for example, the processing device may be either the processor 610 or the encoder/decoder module 630) may be used for one or more of these functions. The external memory may be the memory 620 and/or the storage device 640, for example, a dynamic volatile memory and/or a non-volatile flash memory. In several embodiments, an external non-volatile flash memory may be used to store the operating system of a television. In at least one embodiment, a fast external dynamic volatile memory such as a RAM may be used as working memory for video coding and decoding operations, such as for MPEG-2 part 2 (also known as ITU-T Recommendation H.262 and ISO/IEC 13818-2, also known as MPEG-2 Video), AVC, HEVC, EVC, VVC, AV1, etc.

The input to the elements of system 600 may be provided through various input devices as indicated in block 690. Such input devices include, but are not limited to, (i) an RF portion that may receive an RF signal transmitted, for example, over the air by a broadcaster, (ii) a Composite input terminal, (iii) a USB input terminal, (iv) an HDMI input terminal, (v) a bus such as CAN (Controller Area Network), CAN FD (Controller Area Network Flexible Data-Rate), FlexRay (ISO 17458) or Ethernet (ISO/IEC 802-3) bus when the present disclosure is implemented in the automotive domain.

In various embodiments, the input devices of block 690 may have associated respective input processing elements as known in the art. For example, the RF portion may be associated with elements necessary for (i) selecting a desired frequency (also referred to as selecting a signal, or band-limiting a signal to a band of frequencies), (ii) down-converting the selected signal, (iii) band-limiting again to a narrower band of frequencies to select (for example) a signal frequency band which may be referred to as a channel in certain embodiments, (iv) demodulating the down-converted and band-limited signal, (v) performing error correction, and (vi) demultiplexing to select the desired stream of data packets. The RF portion of various embodiments may include one or more elements to perform these functions, for example, frequency selectors, signal selectors, band-limiters, channel selectors, filters, downconverters, demodulators, error correctors, and de-multiplexers. The RF portion may include a tuner that performs various of these functions, including, for example, down-converting the received signal to a lower frequency (for example, an intermediate frequency or a near-baseband frequency) or to baseband.

In one set-top box embodiment, the RF portion and its associated input processing element may receive an RF signal transmitted over a wired (for example, cable) medium. Then, the RF portion may perform frequency selection by filtering, down-converting, and filtering again to a desired frequency band.

Various embodiments rearrange the order of the above-described (and other) elements, remove some of these elements, and/or add other elements performing similar or different functions.

Adding elements may include inserting elements in between existing elements, such as, for example, inserting amplifiers and an analog-to-digital converter. In various embodiments, the RF portion may include an antenna.

Additionally, the USB and/or HDMI terminals may include respective interface processors for connecting system 600 to other electronic devices across USB and/or HDMI connections. It is to be understood that various aspects of input processing, for example, Reed-Solomon error correction, may be implemented, for example, within a separate input processing IC or within processor 610 as necessary. Similarly, aspects of USB or HDMI interface processing may be implemented within separate interface ICs or within processor 610 as necessary. The demodulated, error corrected, and demultiplexed stream may be provided to various processing elements, including, for example, processor 610, and encoder/decoder 630 operating in combination with the memory and storage elements to process the data stream as necessary for presentation on an output device.

Various elements of system 600 may be provided within an integrated housing. Within the integrated housing, the various elements may be interconnected and transmit data therebetween using suitable connection arrangement 690, for example, an internal bus as known in the art, including the I2C bus, wiring, and printed circuit boards.

The system 600 may include communication interface 650 that enables communication with other devices via communication channel 651. The communication interface 650 may include, but is not limited to, a transceiver configured to transmit and to receive data over communication channel 651. The communication interface 650 may include, but is not limited to, a modem or network card and the communication channel 651 may be implemented, for example, within a wired and/or a wireless medium.

Data may be streamed to system 600, in various embodiments, using a Wi-Fi network such as IEEE 802.11. The Wi-Fi signal of these embodiments may be received over the communications channel 651 and the communications interface 650 which are adapted for Wi-Fi communications. The communications channel 651 of these embodiments may be typically connected to an access point or router that provides access to outside networks including the Internet for allowing streaming applications and other over-the-top communications.

Other embodiments may provide streamed data to the system 600 using a set-top box that delivers the data over the HDMI connection of the input block 690.

Still other embodiments may provide streamed data to the system 600 using the RF connection of the input block 690.

The streamed data may be used as a way for signaling information used by the system 600. The signaling information may comprise the bitstream B and/or information such a number of pixels of a video picture and/or any coding/decoding setup parameters.

It is to be appreciated that signaling may be accomplished in a variety of ways. For example, one or more syntax elements, flags, and so forth may be used to signal information to a corresponding decoder in various embodiments.

System 600 may provide an output signal to various output devices, including a display 661, speakers 671, and other peripheral devices 681. The other peripheral devices 681 may include, in various examples of embodiments, one or more of a stand-alone DVR, a disk player, a stereo system, a lighting system, and other devices that provide a function based on the output of system 600.

In various embodiments, control signals may be communicated between the system 600 and the display 661, speakers 671, or other peripheral devices 681 using signaling such as AV.Link (Audio/Video Link), CEC (Consumer Electronics Control), or other communications protocols that enable device-to-device control with or without user intervention.

The output devices may be communicatively coupled to system 600 via dedicated connections through respective interfaces 660, 670, and 680.

Alternatively, the output devices may be connected to system 600 using the communications channel 651 via the communications interface 650. The display 661 and speakers 671 may be integrated in a single unit with the other components of system 600 in an electronic device such as, for example, a television.

In various embodiments, the display interface 660 may include a display driver, such as, for example, a timing controller (T Con) chip.

The display 661 and speaker 671 may alternatively be separate from one or more of the other components, for example, if the RF portion of input 690 is part of a separate set-top box. In various embodiments in which the display 661 and speakers 671 may be external components, the output signal may be provided via dedicated output connections, including, for example, HDMI ports, USB ports, or COMP outputs.

In FIGS. 1-27, various methods are described herein, and each of the methods includes one or more steps or actions for achieving the described method. Unless a specific order of steps or actions is required for proper operation of the method, the order and/or use of specific steps and/or actions may be modified or combined.

Some examples are described with regard to block diagrams and/or operational flowcharts. Each block represents a circuit element, module, or portion of code which includes one or more executable instructions for implementing the specified logical function(s). It should also be noted that in other implementations, the function(s) noted in the blocks may occur out of the indicated order. For example, two blocks shown in succession may, in fact, be executed substantially concurrently or the blocks may sometimes be executed in the reverse order, depending on the functionality involved.

The implementations and aspects described herein may be implemented in, for example, a method or a process, an apparatus, a computer program, a data stream, a bitstream, or a signal. Even if only discussed in the context of a single form of implementation (for example, discussed only as a method), the implementation of features discussed may also be implemented in other forms (for example, an apparatus or computer program).

The methods may be implemented in, for example, a processor, which refers to processing devices in general, including, for example, a computer, a microprocessor, an integrated circuit, or a programmable logic device. Processors also include communication devices.

Additionally, the methods may be implemented by instructions being performed by a processor, and such instructions (and/or data values produced by an implementation) may be stored on a computer-readable storage medium. A computer-readable storage medium may take the form of a computer-readable program product embodied in one or more computer-readable medium(s) and having computer-readable program code embodied thereon that is executable by a computer. A computer-readable storage medium as used herein may be considered a non-transitory storage medium given the inherent capability to store the information therein as well as the inherent capability to provide retrieval of the information therefrom. A computer-readable storage medium may be, for example, but is not limited to, an electronic, magnetic, optical, electromagnetic, infrared, or semiconductor system, apparatus, or device, or any suitable combination of the foregoing. It is to be appreciated that the following, while providing more specific examples of computer-readable storage mediums to which the present embodiments may be applied, is merely an illustrative and not an exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

The instructions may form an application program tangibly embodied on a processor-readable medium.

Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

An apparatus may be implemented in, for example, appropriate hardware, software, and firmware. Examples of such apparatus include personal computers, laptops, smartphones, tablet computers, digital multimedia set top boxes, digital television receivers, personal video recording systems, connected home appliances, head mounted display devices (HMD, see-through glasses), projectors (beamers), "caves" (system including multiple displays), servers, video encoders, video decoders, post-processors processing output from a video decoder, pre-processors providing input to a video encoder, web servers, set-top boxes, and any other device for processing video pictures or other communication devices. As should be clear, the equipment may be mobile and even installed in a mobile vehicle.

Computer software may be implemented by the processor 610 or by hardware, or by a combination of hardware and software. As a non-limiting example, the embodiments may be also implemented by one or more integrated circuits. The memory 620 may be of any type appropriate to the technical environment and may be implemented using any appropriate data storage technology, such as optical memory devices, magnetic memory devices, semiconductor-based memory devices, fixed memory, and removable memory, as non-limiting examples. The processor 610 may be of any type appropriate to the technical environment, and may encompass one or more of microprocessors, general purpose computers, special purpose computers, and processors based on a multi-core architecture, as non-limiting examples.

As will be evident to one of ordinary skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The terminology used herein is for the purpose of describing particular embodiments only and is not intended to be limiting. As used herein, the singular forms "a", "an", and "the" may be intended to include the plural forms as well, unless the context clearly indicates otherwise. It will be further understood that the terms "includes/comprises" and/ or "including/comprising" when used in this specification, may specify the presence of stated, for example, features, integers, steps, operations, elements, and/or components but do not preclude the presence or addition of one or more other features, integers, steps, operations, elements, components, and/or groups thereof. Moreover, when an element is referred to as being "responsive" or "connected" or "associated with" to another element, it may be directly responsive or connected to or associated with the other element, or intervening elements may be present. In contrast, when an element is referred to as being "directly responsive" or "directly connected" to or "directly associated with" other element, there are no intervening elements present.

It is to be appreciated that the use of any of the symbol/ term "/", "and/or", and "at least one of", for example, in the cases of "A/B", "A and/or B" and "at least one of A and B", may be intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Various numeric values may be used in the present application. The specific values may be for example purposes and the aspects described are not limited to these specific values.

It will be understood that, although the terms first, second, etc. may be used herein to describe various elements, these elements are not limited by these terms. These terms are only used to distinguish one element from another. For example, a first element could be termed a second element, and, similarly, a second element could be termed a first element without departing from the teachings of the present application. No ordering is implied between a first element and a second element.

Reference to "one exemplary embodiment" or "an exemplary embodiment" or "one implementation" or "an implementation", as well as other variations thereof, is frequently used to convey that a particular feature, structure, characteristic, and so forth (described in connection with the embodiment/implementation) is included in at least one embodiment/implementation. Thus, the appearances of the phrase "in one exemplary embodiment" or "in an exemplary embodiment" or "in one implementation" or "in an implementation", as well any other variations, appearing in various places throughout the present application are not necessarily all referring to the same embodiment.

Similarly, reference herein to "in accordance with an exemplary embodiment/example/implementation" or "in an exemplary embodiment/example/implementation", as well as other variations thereof, is frequently used to convey that a particular feature, structure, or characteristic (described in connection with the exemplary embodiment/example/implementation) may be included in at least one exemplary embodiment/example/implementation. Thus, the appearances of the expression "in accordance with an exemplary embodiment/example/implementation" or "in an exemplary embodiment/example/implementation" in various places in the present application are not necessarily all referring to the same exemplary embodiment/example/implementation, nor are separate or alternative exemplary embodiment/examples/implementation necessarily mutually exclusive of other exemplary embodiments/examples/implementation.

Reference numerals appearing in the claims are by way of illustration only and shall have no limiting effect on the scope of the claims. Although not explicitly described, the present embodiments/examples and variants may be employed in any combination or sub-combination.

When a figure is presented as a flow diagram, it should be understood that it also provides a block diagram of a corresponding apparatus. Similarly, when a figure is presented as a block diagram, it should be understood that it also provides a flow diagram of a corresponding method/ process.

Although some of the diagrams include arrows on communication paths to show a primary direction of communication, it is to be understood that communication may occur in the opposite direction to the depicted arrows.

Various implementations involve decoding. "Decoding", as used in this application, may encompass all or part of the processes performed, for example, on a received video picture (including possibly a received bitstream which encodes one or more video picture) in order to produce a final output suitable for display or for further processing in the reconstructed video domain. In various embodiments, such processes include one or more of the processes typically performed by a decoder. In various embodiments, such processes also, or alternatively, include processes performed by a decoder of various implementations described in the present application, for example.

As further examples, in one embodiment "decoding" may refer only to de-quantizing, in one embodiment "decoding" may refer to entropy decoding, in another embodiment "decoding" may refer only to differential decoding, and in another embodiment "decoding" may refer to combinations of de-quantizing, entropy decoding and differential decoding. Whether the phrase "decoding process" may be intended to refer specifically to a subset of operations or generally to the broader decoding process will be clear based on the context of the specific description and is believed to be well understood by those skilled in the art.

Various implementations involve encoding. In an analogous way to the above discussion about "decoding", "encoding" as used in the present application may encompass all or part of the processes performed, for example, on an input video picture in order to produce an output bitstream. In various embodiments, such processes include one or more of the processes typically performed by an encoder. In various embodiments, such processes also, or alternatively, include processes performed by an encoder of various implementations described in this application.

As further examples, in one embodiment "encoding" may refer only to quantizing, in one embodiment "encoding" may refer only to entropy encoding, in another embodiment "encoding" may refer only to differential encoding, and in another embodiment "encoding" may refer to combinations of quantizing, differential encoding and entropy encoding. Whether the phrase "encoding process" may be intended to refer specifically to a subset of operations or generally to the broader encoding process will be clear based on the context of the specific descriptions and is believed to be well understood by those skilled in the art.

Additionally, the present application may refer to "obtaining" various pieces of information. Obtaining the information may include one or more of, for example, estimating the information, calculating the information, predicting the information, or retrieving the information from memory, processing the information, moving the information, copying the information, erasing the information, calculating the information, determining the information, predicting the information, or estimating the information.

Additionally, this application may refer to "receiving" various pieces of information. Receiving the information may include one or more of, for example, accessing the information, or receiving information from a communication network.

Also, as used herein, the word "signal" refers to, among other things, indicating something to a corresponding decoder. For example, in certain embodiments the encoder signals a particular information such as coding parameter or encoded video picture data. In this way, in an embodiment the same parameter may be used at both the encoder side and the decoder side. Thus, for example, an encoder may transmit (explicit signaling) a particular parameter to the decoder so that the decoder may use the same particular parameter. Conversely, if the decoder already has the particular parameter as well as others, then signaling may be used without transmitting (implicit signaling) to simply allow the decoder to know and select the particular parameter. By avoiding transmission of any actual functions, a bit savings is realized in various embodiments. It is to be appreciated that signaling may be accomplished in a variety of ways. For example, one or more syntax elements, flags, and so forth are used to signal information to a corresponding decoder in various embodiments. While the preceding relates to the verb form of the word "signal", the word "signal" may also be used herein as a noun.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method for encoding a video picture into a bitstream of encoded video picture data, the method comprising:
   encoding into the bitstream a default width and a default height of coding-tree unit of a grid of coding-tree units splitting the video picture into picture areas, each coding-tree unit being a picture area subdivided according to a coding tree;
   encoding, into the bitstream, a width of at least one coding-tree unit of the grid of coding-tree units different from the default width and/or a height of at least one coding-tree unit of the grid of coding-tree units different from the default height;
   obtaining encoded video picture data by encoding at least one coding unit (CU) of a coding tree associated with each coding-tree unit (CTU) of the grid of coding-tree units; and
   writing the encoded video data into the bitstream.

2. The method of claim 1, wherein the grid of coding-tree units is determined by
   determining picture areas with low spatial activity and picture areas with high spatial activity by analyzing video picture content; and
   determining the grid of coding-tree units to separate the picture areas with low spatial activity from the picture areas with high spatial activity.

3. The method of claim 1, wherein a spatial activity of the video picture is determined by detecting vertical and horizontal edges from video picture content.

4. The method of claim 3, wherein vertical and horizontal edges of the video picture are detected by applying horizontal and vertical filters on the video picture.

5. The method of claim 3, wherein boundaries of coding-tree units of the grid of coding-tree units are aligned with determined principal vertical and horizontal edges among the detected vertical and horizontal edges.

6. The method of claim 5, wherein a boundary coding-tree unit of the grid of coding-tree units is aligned with a vertical or horizontal edge by minimizing a spatial distance between the boundary and the vertical or horizontal edge.

7. A method of decoding a video picture from a bitstream of encoded video picture data, the method comprising:
   decoding from the bitstream a default width and a default height of coding-tree unit of a grid of coding-tree units splitting the video picture into picture areas, each coding-tree unit being a picture area subdivided according to a coding tree;
   decoding, from the bitstream, a width of at least one coding-tree unit of the grid of coding-tree units different from the default width of coding-tree unit and/or a height of at least one coding-tree unit of the grid of coding-tree units different from the default height of coding-tree unit;
   obtaining a grid of coding-tree units based on the width of at least one coding-tree unit different from the default width and/or the height of at least one coding-tree unit different from the default height;
   obtaining video picture data by decoding at least one coding unit (CU) of a coding tree associated with each coding-tree unit (CTU) of the grid of coding-tree units from the bitstream; and
   obtaining the video picture from the video picture data.

8. The method of claim 7, wherein:
   only some widths of the coding-tree units different from the default width are decoded from the bitstream; and/or
   only some heights of the coding-tree units different from the default height are decoded from the bitstream.

9. The method of claim 7, wherein at least one width of the coding-tree units different from the default width and/or at least one height of the coding-tree units different from the default height is/are decoded from a picture parameter set, a picture header, a slice header or an adaptation parameter set, a slice being a set of coding-tree units.

10. The method of claim 7, further comprising:
   decoding a syntax element indicating if a width of at least one coding-tree unit column is different from the default coding-tree unit width or if a height of at least one coding-tree unit row of the grid of coding-tree units is different from the default coding-tree unit height.

11. The method of claim 7, wherein a syntax element is decoded from the bitstream to indicate if a supra-coding unit is aligned either to a top or a bottom of a coding-tree unit, the supra-coding unit representing a coding-tree root node of a coding-tree associated with a coding-tree unit.

12. An apparatus for decoding a video picture from a bitstream of encoded video picture data, comprising:
   a processor; and
   a memory storing instructions executable by the processor;
   wherein the processor is configured to:
   decoding from the bitstream a default width and a default height of coding-tree unit of a grid of coding-tree units splitting the video picture into picture areas, each coding-tree unit being a picture area subdivided according to a coding tree;

decoding, from the bitstream, a width of at least one coding-tree unit of the grid of coding-tree units different from the default width of coding-tree unit and/or a height of at least one coding-tree unit of the grid of coding-tree units different from the default height of coding-tree unit;

obtaining a grid of coding-tree units based on the width of at least one coding-tree unit different from the default width and/or the height of at least one coding-tree unit different from the default height;

obtaining video picture data by decoding at least one coding unit (CU) of a coding tree associated with each coding-tree unit (CTU) of the grid of coding-tree units from the bitstream; and obtaining the video picture from the video picture data.

13. A non-transitory storage medium carrying instructions of program code for executing the method of claim 7.

14. The method of claim 1, wherein:

only some widths of the coding-tree units different from the default width are encoded into the bitstream; and/or only some heights of the coding-tree units different from the default height are encoded into the bitstream.

15. The method of claim 1, wherein at least one width of the coding-tree units different from the default width and/or at least one height of the coding-tree units different from the default height is/are encoded into a picture parameter set, a picture header, a slice header or an adaptation parameter set, a slice being a set of coding-tree units.

16. The method of claim 1, further comprising:

encoding a syntax element indicating if a width of at least one coding-tree unit column is different from the default coding-tree unit width or if a height of at least one coding-tree unit row of the grid of coding-tree units is different from the default coding-tree unit height.

17. The method of claim 1, wherein a syntax element is encoded into the bitstream to indicate if a supra-coding unit is aligned either to a top or a bottom of a coding-tree unit, the supra-coding unit representing a coding-tree root node of a coding-tree associated with a coding-tree unit.

18. The apparatus of claim 12, wherein:

only some widths of the coding-tree units different from the default width are decoded from the bitstream; and/or only some heights of the coding-tree units different from the default height are decoded from the bitstream.

19. An apparatus of encoding a video picture into a bitstream of encoded video picture data, comprising:

a processor; and a memory storing instructions executable by the processor;

wherein the processor is configured to perform the method of claim 1.

20. A non-transitory storage medium carrying instructions of program code for executing the method of claim 1.

* * * * *